US009346415B2

(12) United States Patent
McElroy et al.

(10) Patent No.: US 9,346,415 B2
(45) Date of Patent: May 24, 2016

(54) CAMERA FOR MOUNTING ON A VEHICLE

(71) Applicant: MAGNA ELECTRONICS INC., Auburn Hills, MI (US)

(72) Inventors: Clarence P. McElroy, Grand Blanc, MI (US); Matthew C. Sesti, Williamston, MI (US); Richard Rieden, Clinton Township, MI (US); Steven V. Byrne, Goodrich, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 14/517,976

(22) Filed: Oct. 20, 2014

(65) Prior Publication Data

US 2015/0035986 A1    Feb. 5, 2015

Related U.S. Application Data

(63) Continuation of application No. 13/148,148, filed as application No. PCT/US2010/023475 on Feb. 8, 2010, now Pat. No. 8,866,907.

(60) Provisional application No. 61/150,364, filed on Feb. 6, 2009.

(51) Int. Cl.
*B60R 11/04* (2006.01)
*H04N 5/225* (2006.01)

(52) U.S. Cl.
CPC .............. *B60R 11/04* (2013.01); *H04N 5/2252* (2013.01); *H04N 5/2254* (2013.01)

(58) Field of Classification Search
None
See application file for complete search history.

(56) References Cited

U.S. PATENT DOCUMENTS

| 4,712,879 A | 12/1987 | Lynam et al. |
| 4,786,966 A | 11/1988 | Hanson et al. |
| 5,073,012 A | 12/1991 | Lynam |

(Continued)

FOREIGN PATENT DOCUMENTS

| DE | 102004001698 A1 | 8/2005 |
| EP | 1387607 | 2/2004 |

(Continued)

OTHER PUBLICATIONS

International Search Report for corresponding PCT Application No. PCT/US2010/023475.

*Primary Examiner* — Sath V Perungavoor
*Assistant Examiner* — Janese Duley
(74) *Attorney, Agent, or Firm* — Gardner, Linn, Burkhart & Flory, LLP

(57) ABSTRACT

A camera for mounting on a vehicle includes a front housing member, a rear housing member, a lens member mounted to the front housing member and an imaging element positioned to receive images from the lens member. A circuit board is mounted to the front housing member and is configured to send to another component signals relating to images received by the imaging element. The circuit board has at least one front electrical connector thereon. The rear housing member has at least one rear electrical connector extending therefrom, with the rear electrical connector electrically connected to the front electrical connector. The rear housing member has a rear alignment structure that aligns the rear electrical connector with respect to the front electrical connector. The rear housing member and the front housing member are unaligned and the rear housing member mates with the front housing member.

20 Claims, 19 Drawing Sheets

(56) References Cited

U.S. PATENT DOCUMENTS

| | | |
|---|---|---|
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,371,659 A | 12/1994 | Pastrick et al. |
| 5,406,414 A | 4/1995 | O'Farrell et al. |
| 5,497,306 A | 3/1996 | Pastrick |
| 5,525,264 A | 6/1996 | Cronin et al. |
| 5,550,677 A | 8/1996 | Schofield et al. |
| 5,567,360 A | 10/1996 | Varaprasad et al. |
| 5,610,756 A | 3/1997 | Lynam et al. |
| 5,668,663 A | 9/1997 | Varaprasad et al. |
| 5,669,699 A | 9/1997 | Pastrick et al. |
| 5,670,935 A | 9/1997 | Schofield et al. |
| 5,724,187 A | 3/1998 | Varaprasad et al. |
| 5,760,962 A | 6/1998 | Schofield et al. |
| 5,796,094 A | 8/1998 | Schofield et al. |
| 5,823,654 A | 10/1998 | Pastrick et al. |
| 5,854,708 A | 12/1998 | Komatsu et al. |
| 5,872,332 A | 2/1999 | Verma |
| 5,877,897 A | 3/1999 | Schofield et al. |
| 5,910,854 A | 6/1999 | Varaprasad et al. |
| 5,949,331 A | 9/1999 | Schofield et al. |
| 5,978,017 A | 11/1999 | Tino |
| 6,002,544 A | 12/1999 | Yatsu |
| 6,013,372 A | 1/2000 | Hayakawa et al. |
| 6,071,606 A | 6/2000 | Yamazaki et al. |
| 6,072,814 A | 6/2000 | Ryan et al. |
| 6,097,023 A | 8/2000 | Schofield et al. |
| 6,151,065 A | 11/2000 | Steed et al. |
| 6,154,306 A | 11/2000 | Varaprasad et al. |
| 6,176,602 B1 | 1/2001 | Pastrick et al. |
| 6,178,034 B1 | 1/2001 | Allemand et al. |
| 6,193,378 B1 | 2/2001 | Tonar et al. |
| 6,201,642 B1 | 3/2001 | Bos |
| 6,222,447 B1 | 4/2001 | Schofield et al. |
| 6,276,821 B1 | 8/2001 | Pastrick et al. |
| 6,302,545 B1 | 10/2001 | Schofield et al. |
| 6,320,176 B1 | 11/2001 | Schofield et al. |
| 6,353,392 B1 | 3/2002 | Schofield et al. |
| 6,396,397 B1 | 5/2002 | Bos et al. |
| 6,483,101 B1 | 11/2002 | Webster |
| 6,498,620 B2 | 12/2002 | Schofield et al. |
| 6,523,964 B2 | 2/2003 | Schofield et al. |
| 6,535,242 B1 | 3/2003 | Strumolo et al. |
| 6,559,435 B2 | 5/2003 | Schofield et al. |
| 6,603,612 B2 | 8/2003 | Nakano |
| 6,611,202 B2 | 8/2003 | Schofield et al. |
| 6,690,268 B2 | 2/2004 | Schofield et al. |
| 6,717,610 B1 | 4/2004 | Bos et al. |
| 6,757,109 B2 | 6/2004 | Bos |
| 6,768,869 B2 | 7/2004 | Constable |
| 6,806,452 B2 | 10/2004 | Bos et al. |
| 6,822,563 B2 | 11/2004 | Bos et al. |
| 6,831,261 B2 | 12/2004 | Schofield et al. |
| 6,891,563 B2 | 5/2005 | Schofield et al. |
| 6,946,978 B2 | 9/2005 | Schofield |
| 6,977,619 B2 | 12/2005 | March et al. |
| 7,004,606 B2 | 2/2006 | Schofield |
| 7,005,974 B2 | 2/2006 | McMahon et al. |
| 7,015,944 B2 | 3/2006 | Holz et al. |
| 7,038,577 B2 | 5/2006 | Pawlicki et al. |
| 7,123,168 B2 | 10/2006 | Schofield |
| 7,255,451 B2 | 8/2007 | McCabe et al. |
| 7,339,149 B1 | 3/2008 | Schofield et al. |
| 7,370,983 B2 | 5/2008 | DeWind et al. |
| 7,453,509 B2 | 11/2008 | Losehand et al. |
| 7,835,634 B2 | 11/2010 | Berend et al. |
| 7,965,336 B2 | 6/2011 | Bingle et al. |
| 8,482,664 B2 * | 7/2013 | Byrne ............... B60R 1/00 348/148 |
| 8,866,907 B2 | 10/2014 | McElroy et al. |
| 2002/0159270 A1 | 10/2002 | Lynam et al. |
| 2003/0090569 A1 | 5/2003 | Poechmueller |
| 2003/0198467 A1 | 10/2003 | Constable |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0077118 A1 | 4/2004 | Prior |
| 2005/0128289 A1 | 6/2005 | Ray |
| 2005/0185088 A1 | 8/2005 | Kale et al. |
| 2005/0232469 A1 | 10/2005 | Schofield et al. |
| 2006/0038668 A1 | 2/2006 | DeWard et al. |
| 2006/0049533 A1 | 3/2006 | Kamoshita |
| 2006/0050018 A1 | 3/2006 | Hutzel et al. |
| 2006/0061008 A1 | 3/2006 | Karner et al. |
| 2006/0125919 A1 | 6/2006 | Camilleri et al. |
| 2006/0171704 A1 | 8/2006 | Bingle et al. |
| 2006/0184297 A1 | 8/2006 | Higgins-Luthman |
| 2006/0228103 A1 | 10/2006 | Go |
| 2007/0223913 A1 | 9/2007 | Lee et al. |
| 2007/0279518 A1 | 12/2007 | Apel et al. |
| 2008/0043105 A1 | 2/2008 | Kallhammer |
| 2008/0131112 A1 | 6/2008 | Aoki et al. |
| 2009/0003811 A1 | 1/2009 | Berend et al. |
| 2009/0244361 A1 | 10/2009 | Gebauer et al. |
| 2011/0310248 A1 | 12/2011 | McElroy et al. |

FOREIGN PATENT DOCUMENTS

| | | |
|---|---|---|
| EP | 1684388 | 7/2006 |
| JP | 0884277 A | 3/1996 |
| WO | WO2004/047421 | 6/2004 |
| WO | WO2005/069602 | 7/2005 |
| WO | WO2007/053404 | 5/2007 |
| WO | WO2007121113 | 10/2007 |
| WO | WO2008023894 | 2/2008 |

* cited by examiner

CAMERA FOR MOUNTING ON A VEHICLE

CROSS REFERENCE TO RELATED APPLICATIONS

The present application is a continuation of U.S. patent application Ser. No. 13/148,148, filed Sep. 7, 2011, now U.S. Pat. No. 8,866,907, which is a 371 national phase filing of PCT Application No. PCT/US2010/023475, filed Feb. 8, 2010, which claims the filing benefit of U.S. provisional application Ser. No. 61/150,364, filed Feb. 6, 2009.

FIELD OF THE INVENTION

The present invention relates to a camera for use in vehicles, and more particularly rearview cameras for use in vehicles.

BACKGROUND OF THE INVENTION

A typical camera for mounting on a vehicle has a lens member, an imaging element, a circuit board and housing members that connect together. In particular for certain applications, such as for some applications wherein the camera is rearwardly facing and is mounted in a rear panel on a vehicle, there can be relatively severe space restrictions for the camera. Additionally, some cameras are relatively complex assemblies that are expensive, and that can suffer from reliability problems due to the number of components and the number of individual electrical connections that are associated therewith. Another problem with some cameras is that their mounting position can be significantly out from their intended position due to a stack up of tolerances that may exist with the components that make up the camera and that are involved in its mounting to the vehicle panel.

It would be advantageous to provide a camera that addresses one or more of these considerations.

SUMMARY OF THE INVENTION

In a first aspect, the invention is directed to a camera for mounting on a vehicle, wherein the camera includes a front housing member that holds a lens member, an imaging element and a circuit board with at least one front electrical connector thereon, and a rear housing member that holds at least one rear electrical connector that is directly mounted to the at least one front electrical connector. By directly mounting the front and rear electrical connectors, a jumper wire is not needed, thereby reducing cost and eliminating potential sources of circuit failures that are associated with the use of jumper wires.

In one embodiment of the first aspect, the front and rear housing members are not aligned with respect to each other. The rear housing member has a rear alignment structure that aligns the rear electrical connector with respect to the at least one front electrical connector. The rear housing member mates with the front housing member to define a camera interior. The circuit board, the at least one front electrical connector and the at least one rear electrical connector are positioned in the camera interior.

In another embodiment of the first aspect, the rear housing member has a rear alignment structure that aligns the rear electrical connector with respect to the at least one front electrical connector. The rear housing member mates with the front housing member generally along a plane so that the rear housing member and front housing member are unaligned with respect to each other and wherein the rear housing member and the front housing member together define a camera interior. The circuit board, the at least one front electrical connector and the at least one rear electrical connector are positioned in the camera interior.

In yet another embodiment, the front and rear housing members are aligned with respect to each other. The at least one rear electrical connector and the at least one front electrical connector are urged together by at least one biasing member. The rear housing member mates with the front housing member to define a camera interior. The circuit board, the at least one front electrical connector and the at least one rear electrical connector are positioned in the camera interior.

In yet another embodiment, the invention is directed to a method of assembling a camera for a vehicle, comprising:

(a) mounting a lens member, an imaging element and a circuit board to a front housing member, wherein the imaging element is positioned to receive images from the lens member, wherein the circuit board is mounted to the front housing member, wherein the circuit board is configured to send to another component signals relating to images received by the imaging element, wherein the circuit board has at least one front electrical connector thereon;

(b) providing a rear housing member with at least one rear electrical connector thereon;

(c) aligning the rear electrical connector with respect to the at least one front electrical connector;

(d) forming at least one connection between the at least one rear electrical connector and the at least one front electrical connector; and (e) joining the front and rear housing members together to define a camera interior in which the circuit board, the at least one front electrical connector and the at least one rear electrical connector are positioned, without aligning the front and rear housing members with respect to one another.

In a second aspect, the invention is directed to a camera for mounting on a vehicle, wherein the camera includes a front housing member that holds a lens member, an imaging element, a circuit board and a rear housing member. At least the front housing member includes a coating of electrically conductive material on its inner surface, that is electrically connected to the circuit board and that is electrically connectable to ground.

In an embodiment of the second aspect, the circuit board has at least one front electrical connector thereon. One of the at least one front connector is in electrical communication with the front housing member coating and is electrically connectable to ground. The rear housing member has at least one rear electrical connector thereon. The at least one rear electrical connector is connected to the at least one front electrical connector.

In a third aspect, the invention is directed to a camera for mounting on a vehicle panel, wherein the camera is configured to rotate into a locking position on the vehicle panel, without the need for camera mounting fasteners.

In an embodiment of the third aspect, the camera includes a front housing member, a lens member, an imaging element, a circuit board, a rear housing member and a camera-associated locking structure. The lens member extends along a camera axis. The lens member and circuit board are mounted to the front housing member. The camera-associated locking structure is connected to at least one of the front housing member, the lens member and the rear housing member. The camera-associated locking structure is engageable with a vehicle panel-associated locking structure on the vehicle panel. The camera-associated locking structure is rotatable between an unlocked position wherein the camera-associated locking structure is disengaged from the vehicle panel-associated locking structure and a locked position wherein the camera-associated locking structure is engaged with the vehicle panel-associated locking structure to prevent axial movement of the camera relative to the vehicle panel. One of the camera-associated and vehicle panel-associated locking structures includes a first locking surface and a second locking surface that generally axially face each other. The other of the camera-associated and vehicle panel-associated locking structures includes a third locking surface and a fourth locking surface that generally axially face away from each other. In another embodiment of the third aspect, the invention is directed to a combination of the camera and the vehicle panel.

In a fourth aspect, the invention is directed to a combination of a camera and a vehicle panel wherein the camera lacks a front housing member and instead includes components that are directly mounted to the vehicle panel.

In an embodiment of the fourth aspect, the camera includes a lens member, an imaging element and a circuit board. The lens member is fixedly connected with respect to the circuit board. The circuit board is mounted to the vehicle panel.

BRIEF DESCRIPTION OF THE DRAWINGS

The present invention will now be described by way of example only with reference to the attached drawings, in which.

DETAILED DESCRIPTION OF THE INVENTION

Figure 1:
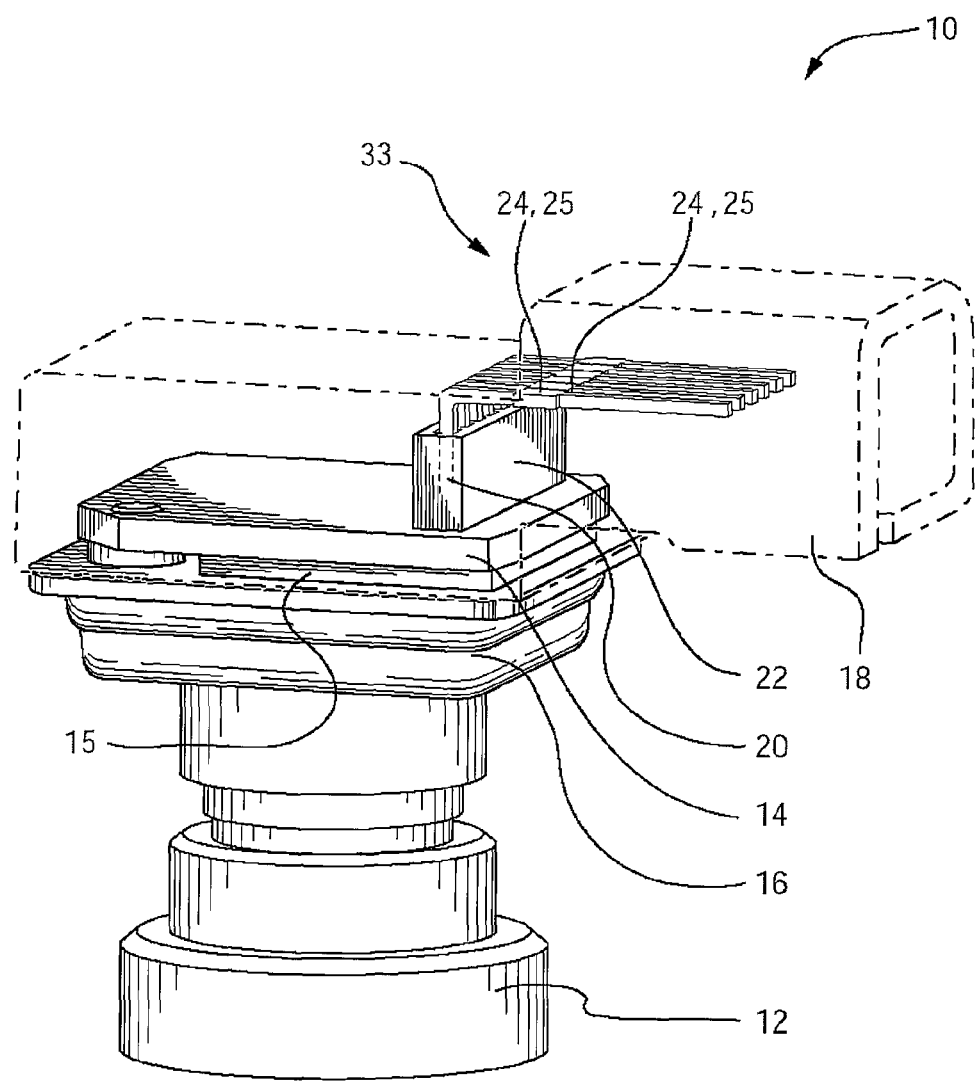
FIG. 1 is a perspective view of a camera in accordance with an embodiment of the present invention.

Reference is made to FIG. 1, which shows a camera 10 for use in a vehicle, and in particular for use as a rearview camera in a vehicle. The camera 10 includes a lens member 12, a circuit board 14, an imaging element 15, a front housing member 16 and a rear housing member 18 (shown for illustrative purposes only in FIG. 1 as being transparent). The lens member 12 may be any suitable lens member known in the art, and is mounted to the front housing member 16.

Note that the terms 'front' and Year' as used in the present document refer to the front of the camera 10 (i.e., the portion of the camera where the lens member is located), and the rear of the camera 10 (i.e., the portion of the camera 10 opposite the front of the camera 10). When the camera 10 is used in a rearview application in a vehicle, the front of the camera 10 thus faces rearwardly relative to the vehicle and the rear of the camera 10 faces towards the front of the vehicle.

The imaging element 15 is positioned in a selected position to receive images through the lens member 12. The imaging element 15 may be any suitable imaging element a charge-coupled device (CCD) or a complimentary metal-oxide semiconductor (CMOS) sensor. The circuit board 14 receives signals from the imaging element 15 and sends signals relating to images received on the imaging element 15 to one or more other components such as another computing device within the vehicle. The imaging element 15 may be mounted directly on the circuit board 14.

Figure 2:
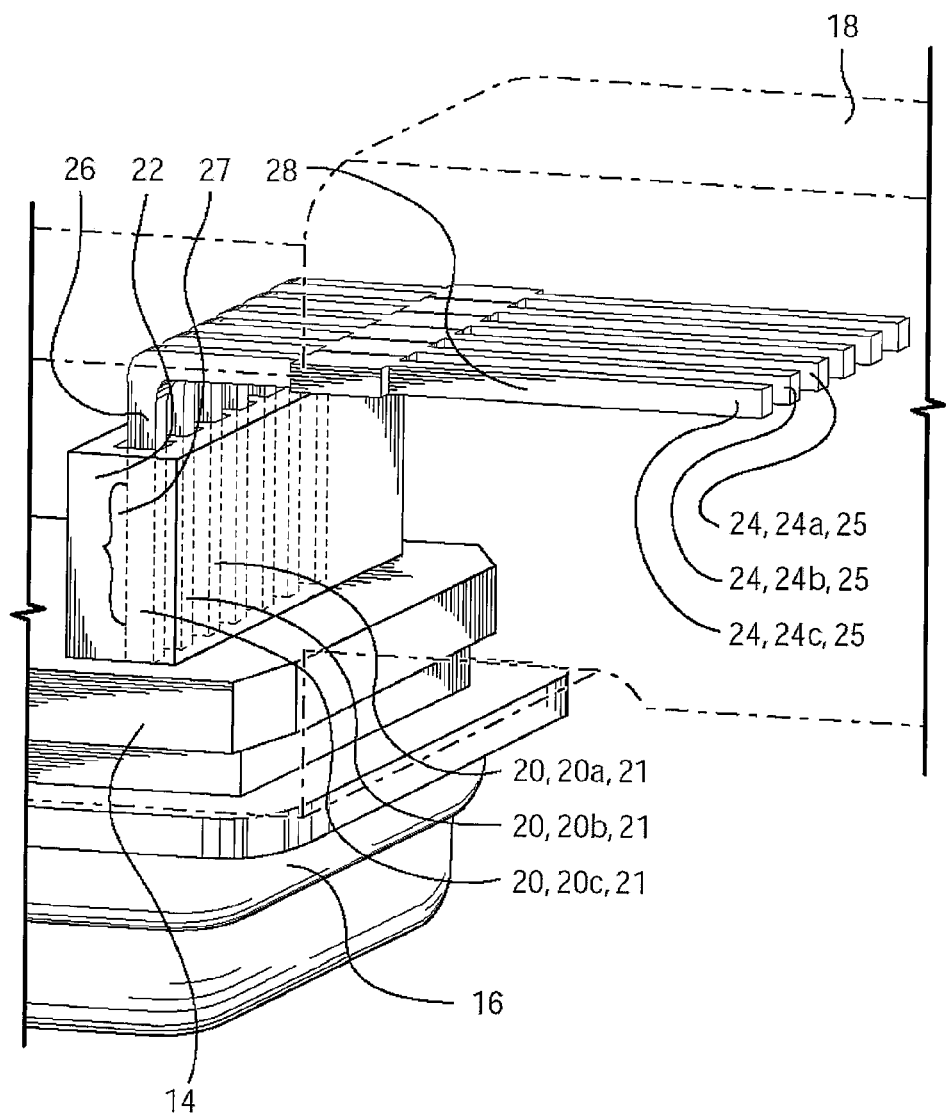
FIG. 2 is a magnified perspective view of a portion of the camera shown in FIG. 1.

The circuit board is mounted to the front housing member 16. Referring to FIG. 2, a plurality of front electrical connectors 20 are provided on the circuit board 14, which are used to electrically connect the circuit board 14 to associated elements in the vehicle (not shown). For example, a first front electrical connector 20a may be a power connector, and may be configured to receive power from a power source (not shown) located in the vehicle. A second front electrical connector 20b may be configured to send video signals to a controller (not shown) in the vehicle, which displays the video signals on a screen inside the vehicle cabin. A third front electrical connector 20c may connect to ground, and may be configured to conduct any buildup of static electricity that might otherwise damage the circuit board, which is described in further detail below. While a plurality of front electrical connectors 20 are shown, it is alternatively possible for the circuit board 14 to have as few as one front electrical connector thereon.

The front electrical connectors 20 may be female electrical connectors 21, and may be provided in a female electrical connector housing 22 that is fixedly mounted to the circuit board 14.

The rear housing member 18 has a plurality of rear electrical connectors 24 that are electrically connected to the front electrical connectors 20 on the circuit board 14 and are configured to electrically connect the circuit board 14 to associated elements in the vehicle. For example, a first rear electrical connector 24a connects between the first front electrical connector 20a and a power source in the vehicle. A second rear electrical connector 24b connects between the second front electrical connector 20b and the controller in the vehicle. A third rear electrical connector 24c connects between the third front electrical connector 20c and a grounding element in the vehicle. A plurality of rear electrical connectors 24 are shown, however it is alternatively possible for the rear housing member 18 to have as few as one rear electrical connector 24 therein.

The rear electrical connectors 24 may be conductive pins 25 that are received in the female electrical connectors 21. The rear electrical connectors 24 may be incorporated into the rear housing member 18 by any suitable means, such as by insert molding. In such embodiments, the rear electrical connectors 24 may be integral with the rear housing member 18.

Each rear electrical connector 24 has a front end 26 where it connects to one of the front electrical connectors 20. The connection between the rear electrical connector 24 and the front electrical connector 20 is shown at 27. Each rear electrical connector 24 further has a rear end 28 that is configured to connect with an associated element in the vehicle (e.g., a power source, a controller).

Figure 3:
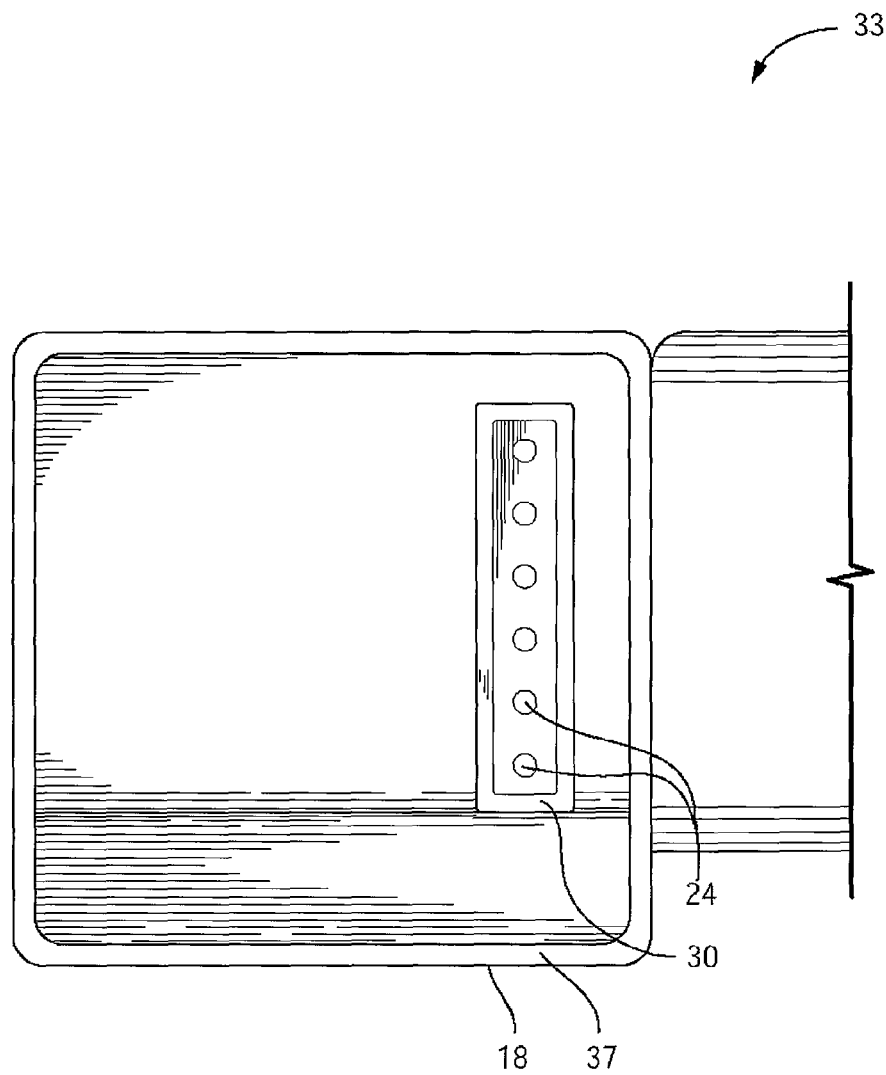
FIG. 3 is a plan view of a rear housing member from the camera shown in FIG. 1.
Figure 4:
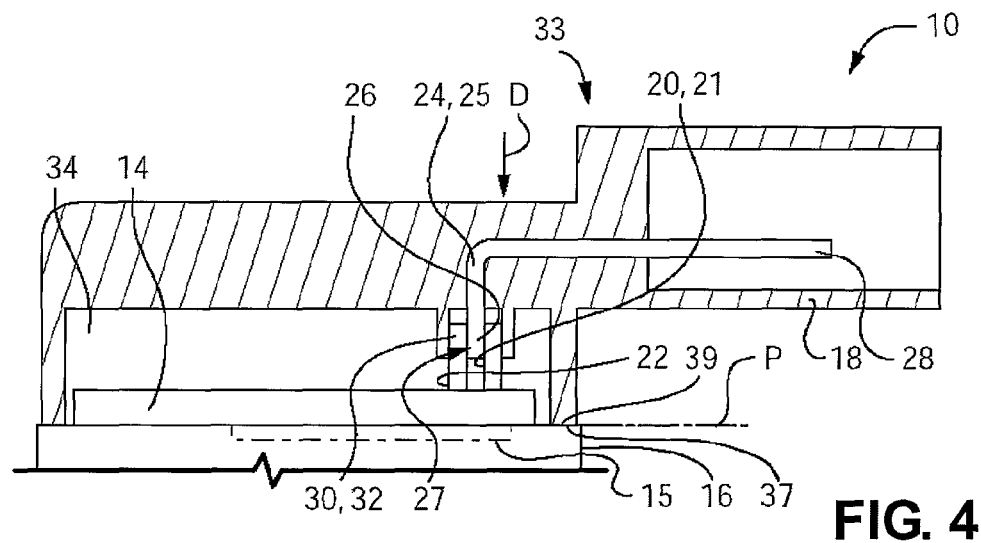
FIG. 4 is a magnified sectional side view of a portion of the camera shown in FIG. 1.

A rear alignment structure 30 (FIGS. 3 and 4) is provided that aligns the rear electrical connectors 24 with respect to the front electrical connectors 20 (FIG. 4). The rear alignment structure 30 may comprise a sleeve 32 that is molded integrally with the rear housing member 18. The sleeve 32 snugly receives the female electrical connector housing 22 when the rear electrical connectors 24 are connected to the front electrical connectors 20. Because the sleeve 32 and the pins 25 are integrally formed together in a single part 33 (which includes the rear housing member 18, the rear electrical connectors 24 and the sleeve 32), the sleeve 32 may be considered to align the rear electrical connectors 24 with the front electrical connectors 20. The sleeve 32 may surround the rear electrical connectors 24, as shown in FIG. 3, or alternatively, it may be positioned remotely from the rear electrical connectors 24 and may snugly receive some other structure than the female electrical connector housing 22.

Figure 5:
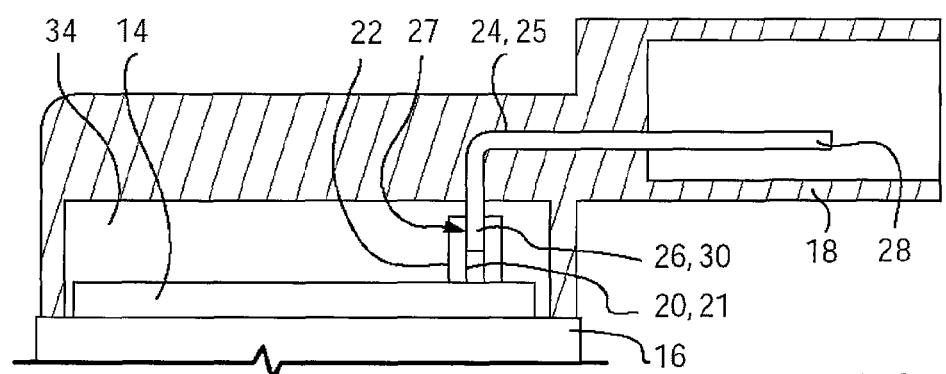
FIG. 5 is a magnified sectional side view of an alternative structure for the portion of the camera shown in FIG. 4.

As shown in FIG. 5, it is alternatively possible for the rear electrical connectors 24 themselves to be the sole rear alignment structure 30.

Referring to FIG. 4, the rear housing member 18 has a front face 37 that mates with a rear face 39 on the front housing member 16. It will be noted that the mating of the front face 37 and rear face 39 takes place along a mating plane P. As a result, the mating of the front face 37 and rear face 39 does not serve to align the rear housing member 18 with the front housing member 16. By not aligning the front and rear housing members 16 and 18 with each other, a potential source of stress on the front and rear electrical connectors 20 and 24 is eliminated, since alignment between the front and rear housing members 16 and 18 might not correspond precisely to alignment of the front and rear electrical connectors 20 and 24.

The mating plane P is shown in FIG. 4 as being generally perpendicular to the direction of insertion of the pins 25 into the female electrical connectors 21, which is shown at D. It will be noted that the mating plane P need not be perpendicular to the direction of insertion D, and may instead extend at some other angle to the direction of insertion D.

Additionally, the front and rear faces 37 and 39 of the rear and front housing members 18 and 16 respectively need not themselves be flat in profile. For example, they may have a rounded profile or some other suitable shape.

The front and rear housing members 16 and 18 together define a camera interior 34 in which the circuit board 14 and the connection between the front and rear electrical connectors 20 and 24 are positioned. In this way, the front and rear housing members 16 and 18 protect the connection 27 between the front and rear electrical connectors 20 and 24 from exposure and damage.

The front and rear housing members 16 and 18 may be sealingly joined together by some suitable means, such as by welding or by use of adhesive.

Figure 6:
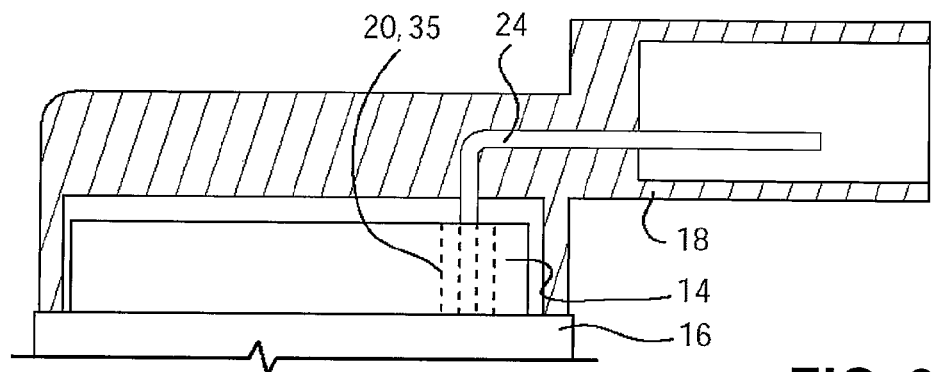
FIG. 6 is a magnified sectional side of another alternative structure for the portion of the camera shown in FIG. 4.

Referring to FIG. 6, it is alternatively possible for the front electrical connectors 20 to be mounted directly in the circuit board 14, e.g., in the form of apertures 35 in the circuit board 14.

The front and rear housing members 16 and 18 may be made from any suitable material, such as a polymeric material, such as a material called Xenoy™ from Sabic Americas, Inc. in Houston, Tex., USA. In instances wherein the front and rear housing members 16 and 18 may build up a static electrical charge it is preferable to provide means to inhibit such a buildup so as to protect components such as the circuit board 14.

Figure 7:
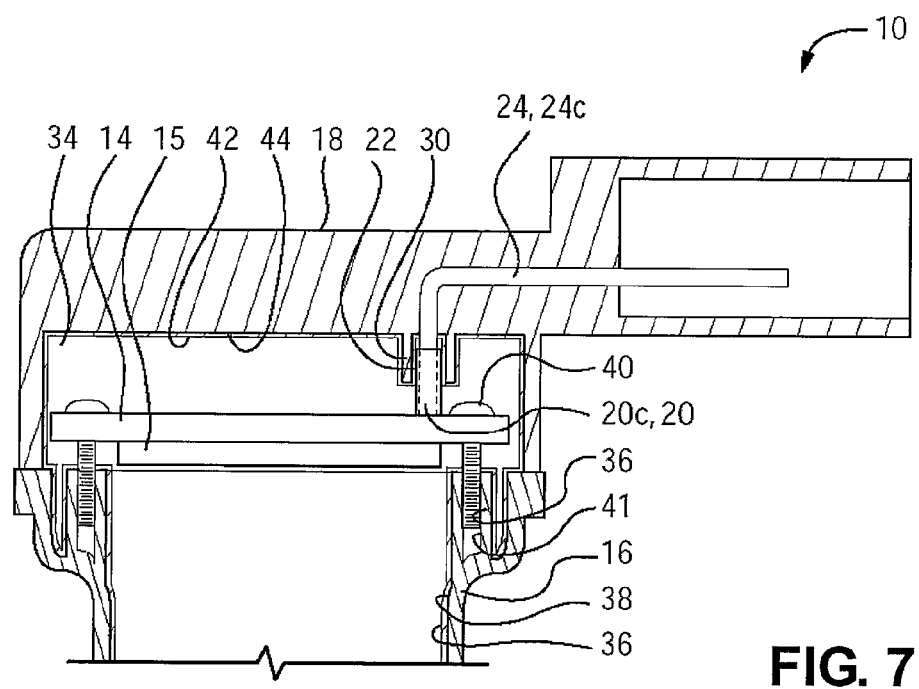
FIG. 7 is another magnified sectional side view of a portion of the camera shown in FIG. 1, showing structure used to ground elements of the camera.

Referring to FIG. 7, to inhibit the buildup of static electricity on the front housing member 16, a front housing member coating 36 of electrically conductive material may be provided on the front housing member interior surface, shown at 38. The front electrical connector 20c (which may be referred to as a front ground connector) may be electrically connected to the front housing member coating 36 any suitable way. For example, the circuit board 14 may be mounted to the front housing member 16 by an electrically conductive circuit board mounting fastener 40, which may be a mechanical fastener such as a machine screw that engages an aperture 41 (e.g., a threaded aperture) on the front housing member 16. The aperture 41 may have the front housing member coating 36 thereon so that the circuit board mounting fastener 40 is in direct contact with the front housing member coating 36. The front ground connector 20c may be electrically connected to the circuit board mounting fastener 40 by an electrical trace (not shown) on the circuit board 14. The front ground connector 20c thereby conducts any buildup of electricity away from the front housing member 16 to the rear electrical connector 24c (which may be referred to as a rear ground connector), which in turn conducts the electricity to a ground point in the vehicle. The front housing member coating 36 may be any suitable material, such as Aluminum.

To inhibit the buildup of static electricity on the rear housing member 18, a rear housing member coating 42 of electrically conductive material may be provided on the rear housing member interior surface, shown at 44. The rear housing member coating 42 may be applied to both the rear housing member interior surface 44 and to at least a base portion of the rear ground connector 24c to electrically connect the rear ground connector 24c to the rear housing member coating 42. As a result, any electrical charge that is built up on the rear housing member 18 is conducted away by the rear housing member coating 42 to the rear ground connector 24c and out to ground at a suitable location in the vehicle. It will be understood that the other rear electrical connectors 24 (e.g., the rear electrical connectors 24a and 24b shown in FIG. 2) are not electrically connected to the rear housing member coating 42 (FIG. 7). The rear housing member coating 42 may be any suitable material, such as Aluminum.

Figure 8:
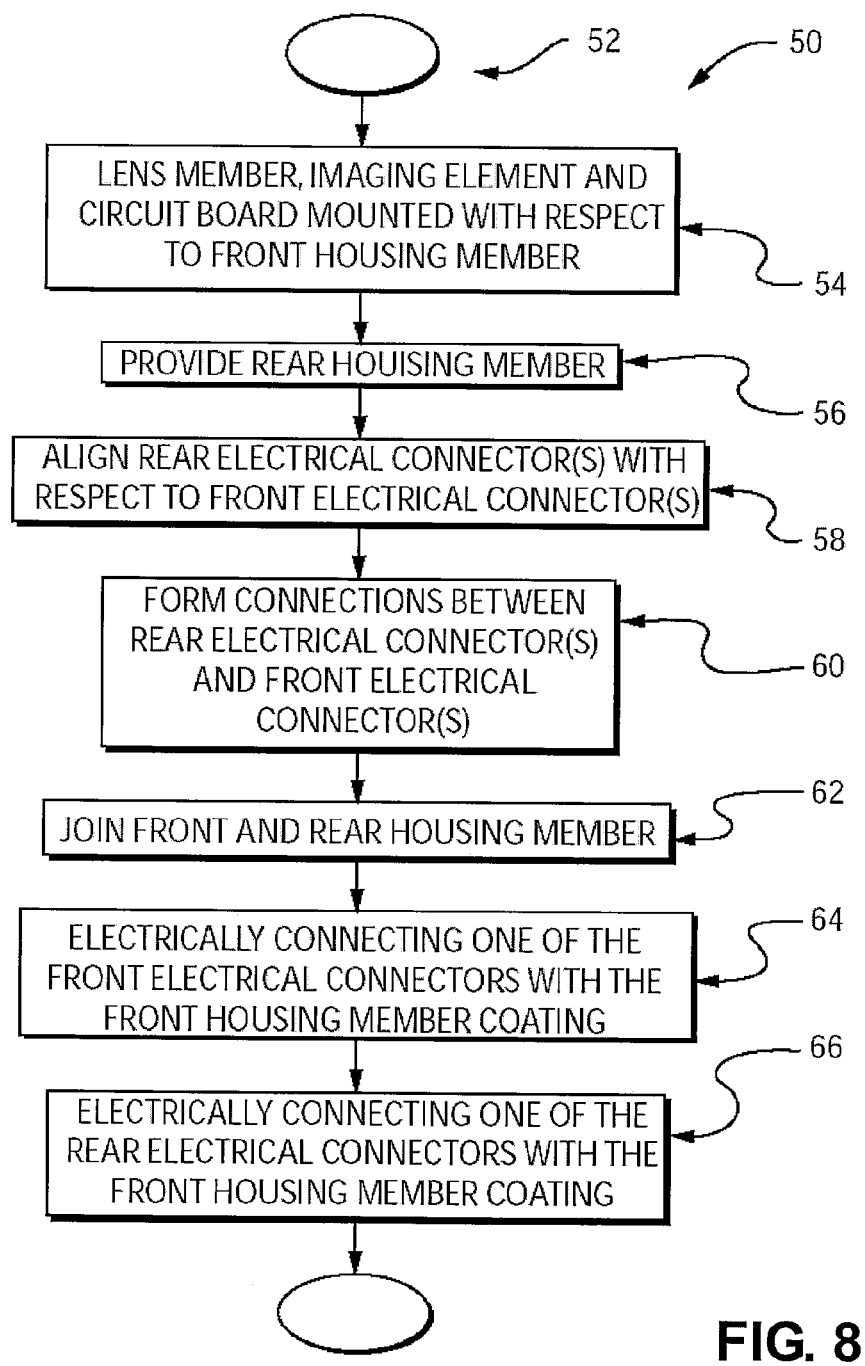
FIG. 8 is a flow diagram illustrating a method of making a camera in accordance with another embodiment of the present invention.

Reference is made to FIG. 8, which shows a method 50 of assembling a camera, such as the camera 10 shown in FIG. 4, in accordance with another embodiment of the present invention. The method steps shown in FIG. 8 may be described in relation to features shown in the exemplary camera 10 shown in FIG. 4. The method 50 begins at step 52. At step 54, the lens member 12 and the circuit board 14 are mounted to the front housing member 16. At step 56, the rear housing member 18 is provided which has the one or more rear electrical connectors 24 thereon. At step 58, the at least one rear electrical connector 24 is aligned with respect to the at least one front electrical connector 20. In a particular embodiment, such as that shown in FIG. 4, step 58 may comprise inserting the female electrical connector housing 22 into the sleeve 32. Alternatively, step 58 may comprise inserting the pins 25 themselves into the female electrical connectors 21. At step 60, at least one connection is formed between the at least one rear electrical connector 24 and the at least one front electrical connector 20. It will be noted that step 60 and step 58 may both be carried out by comprise inserting the pins 25 into the female electrical connectors 21 in embodiments wherein no other alignment means is provided and wherein the rear connectors 24 are pins 25 and the front connectors 20 are female electrical connectors 21. At step 62, the front and rear housing members 16 and 18 are joined together to define the camera interior 34 in which the circuit board 14, the at least one front electrical connector 20 and the at least one rear electrical connector 24 are positioned, without aligning the front and rear housing members 16 and 18 with respect to one another. The front and rear housing members 16 and 18 may be sealingly joined together using such means as adhesive or welding.

It will be noted that several of the aforementioned steps may take place simultaneously. For example, when the pins 25 are inserted fully into the at least one female electrical connector 21, the rear electrical connector 24 is aligned with respect to the at least one front electrical connector 20, a connection is made between the front and rear electrical connectors 20 and 24, and the front and rear housing members 16 and 18 are joined together to define the camera interior 34.

In embodiments wherein the front housing member 16 has a front housing member interior surface 38 that has a front housing member coating 36 of electrically conductive material thereon, the method 50 may further include step 64, which is electrically connecting one of the at least one front electrical connector 20 with the front housing member coating 36.

In embodiments wherein the rear housing member 18 has a rear housing member interior surface 44 that has a rear housing member coating 42 of electrically conductive material thereon, the method 50 may further include step 66, which is electrically connecting one of the at least one rear electrical connector 24 with the rear housing member coating 42.

With continued reference to FIG. 4, providing a camera with the front and rear electrical connectors 20 and 24 aligned with each other permits them to be directly connected to one another without the need for intermediate electrical connectors, such as jumper wires. Eliminating jumper wires eliminates a source of electrical failure for the camera 10.

In an alternative embodiment that is not shown it is possible for the front electrical connectors 20 to be pins 25 (e.g., which extend from a pin housing (not shown) that is mounted onto the circuit board 14), and for the rear electrical connectors 24 to be female electrical connectors 21. As another alternative, some of the front electrical connectors 20 may be pins 25 and some may be female electrical connectors 21, and some of the rear electrical connectors 24 may be female or male, in a complementary arrangement.

It has been shown for the rear electrical connectors 24 to be integral (e.g., by insert molding) with the rear housing member 18. It is alternatively possible however, for the rear electrical connectors 24 to not be integral with the rear housing member 18, particularly in embodiments wherein the sleeve 32 is omitted.

By providing instead a direct connection between the front and rear electrical connectors 20 and 24, the overall size of the camera 10 may be reduced, since room for a jumper cable with connectors at each end is not needed.

Figure 9:
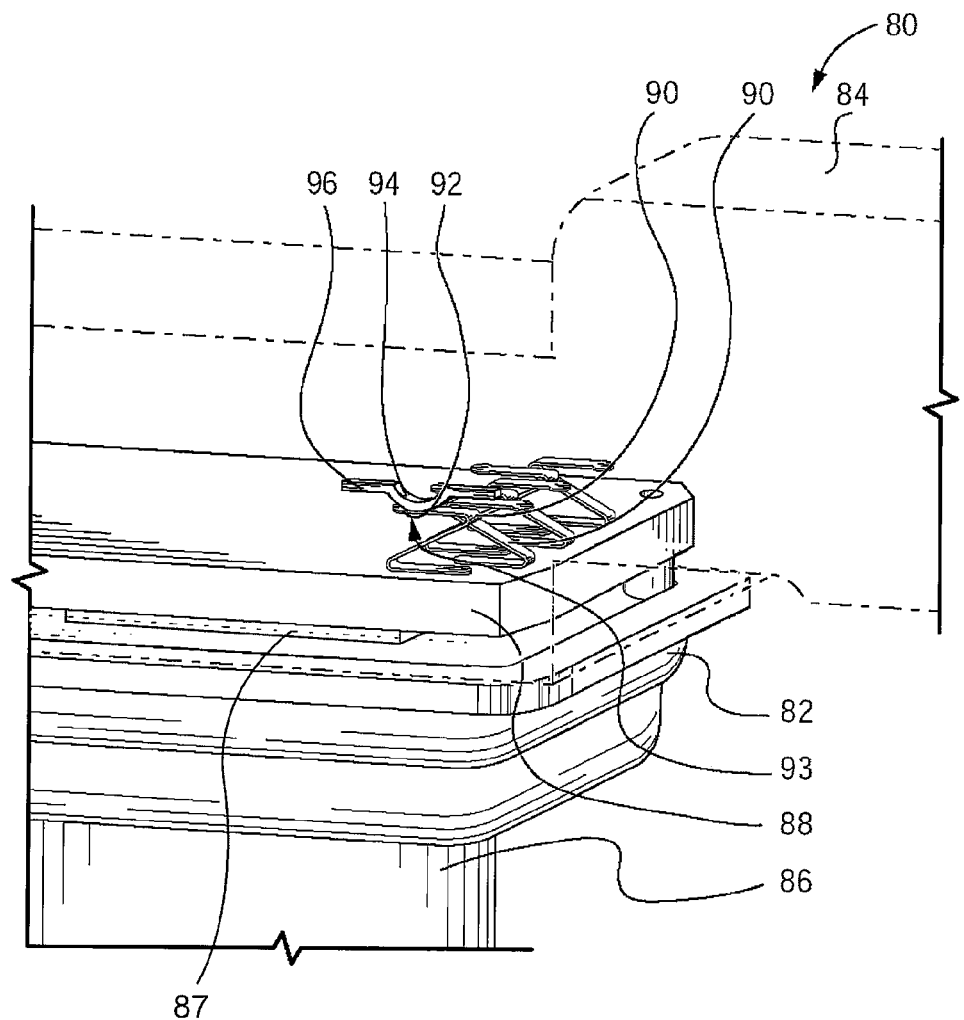
FIG. 9 is a perspective view of a camera in accordance with another embodiment of the present invention.

Reference is made to FIG. 9, which shows a camera 80 in accordance with another embodiment of the present invention. The camera 80 permits alignment of the front and rear housing members, shown at 82 and 84, which can reduce the overall space necessary for the camera 80 relative to the camera 10 (FIG. 2) which has unaligned front and rear housing members 16 and 18. The rear housing member 84 is shown as transparent in FIG. 9 to more clearly show the underlying structure.

The camera 80 includes a lens member 86, which may be similar to the lens member 12 (FIG. 1), an imaging element 87 which may be similar to the imaging element 15 (FIG. 1), a circuit board 88 which may be similar to the circuit board 14 (FIG. 1), the front housing member 82 and the rear housing member 84. The lens member 86 and circuit board 88 may mount to the front housing member 82 in any suitable way. The circuit board 88 has thereon a plurality of front electrical connectors 90 which have rear ends 92 that form connections 93 with front ends 94 of a plurality of rear electrical connectors 96 that are connected to the rear housing member 84. The rear electrical connectors 96 may be integral with the rear housing member 84 (e.g., by insert molding) or they may be connected in some other way.

To form the connections 93, the rear ends 92 of the front electrical connectors 90 and the front ends 94 of the rear electrical connectors 96 may be configured to permit some misalignment therebetween. For example, the rear ends 92 of the front electrical connectors 90 may be configured as generally circular conductive pads 97 (shown more clearly in FIG. 10) of a selected size to permit the connections 93 to be formed even in situations where the front and rear electrical connectors are significantly misaligned due to the tolerances that play a role in their relative positions.

Biasing members 98 may be provided to urge the rear ends 92 of the front electrical connectors 90 and the front ends 94 of the rear electrical connectors 96 towards engagement with each other. For example, the front electrical connectors 90 may include a bend 100 thereby providing a biasing member and live hinge that urges the rear ends 92 into engagement with the front ends 94. The biasing members 98 are preferably configured to urge the engagement between the rear and front ends 92 and 94 with a sufficiently high force that the connection 93 remains made even when the vehicle encounters bumps (e.g., from road or route surface imperfections during travel).

Figure 11:
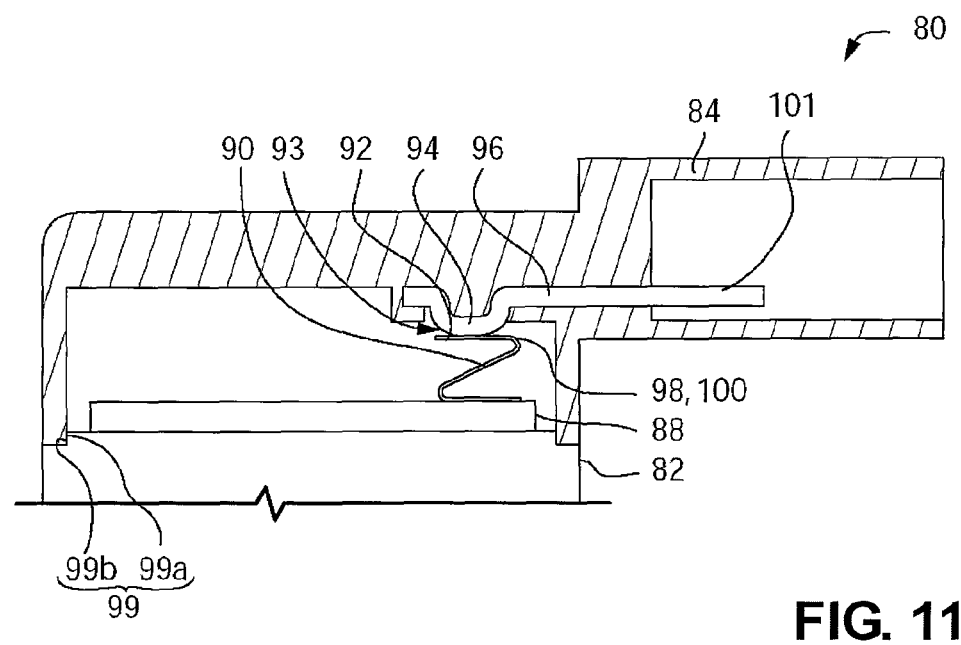
FIG. 11 is a magnified sectional side view of a portion of the camera shown in FIG. 9.

Referring to FIG. 11, an alignment mechanism 99 may be provided on the front and rear housing members 82 and 84 to align them with respect to each other. The alignment mechanism 99 may have any suitable structure. For example, the alignment mechanism 99 may include a rear alignment surface 99a on the rear housing member 84 that mates with a shoulder 99b on the front housing member 82.

Instead of providing the conductive pads 97 at the rear ends 92 of the front electrical connectors 90, conductive pads may alternatively be formed on the front ends 94 of the rear electrical connectors 96. As yet another alternative, it is possible to provide conductive pads on both the rear and front ends 92 and 94.

The rear electrical connectors 96 may have rear ends 101 that are similar in configuration to the rear ends 28 (FIG. 1) of the rear electrical connectors 24.

The functions of the front and rear electrical connectors 90 and 96 may be similar to the functions of the front and rear electrical connectors 20 and 24 in the embodiment shown in FIG. 2 (e.g., for carrying power, data, current to ground).

The grounding of the front and rear housing members 90 and 96 and the circuit board 88 may be achieved similarly to the grounding that is achieved for the camera 10, i.e., by coating the front and rear housing members 90 and 96 with electrically conductive material and by electrically connecting the circuit board 88, and one of the front and rear electrical connectors 90 and 96 to the associated coatings.

Figure 12:
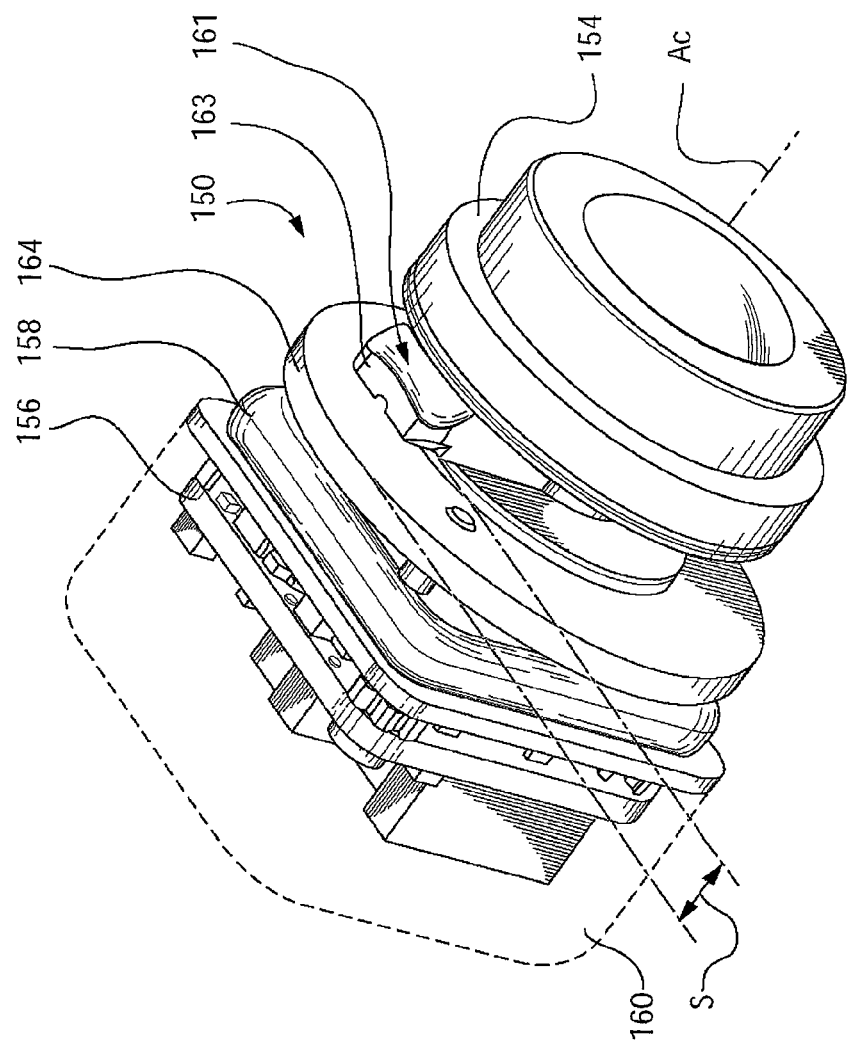
FIG. 12 is a perspective view of a camera in accordance with another embodiment of the present invention.

Reference is made to FIG. 12, which shows a camera 150 in accordance with another embodiment of the present invention. The camera 150 is capable of being mounted to a vehicle panel, shown at 152 (FIG. 14) relatively simply and with high positional accuracy. The vehicle panel 152 may be any suitable vehicle panel, such as a liftgate handle or panel, a tailgate handle or panel, a spoiler or a lightbar.

Referring to FIG. 12, the camera 150 includes a lens member 154 which may be similar to the lens member 12 (FIG. 1), an imaging element 155 (FIG. 15) which may be similar to the imaging element 15 (FIG. 1), a circuit board 156 (FIG. 12) which may be similar to the circuit board 14 (FIG. 1), a front housing member 158 and a rear housing member 160. The lens member 154 extends along (and defines) a camera axis Ac.

Figure 13:
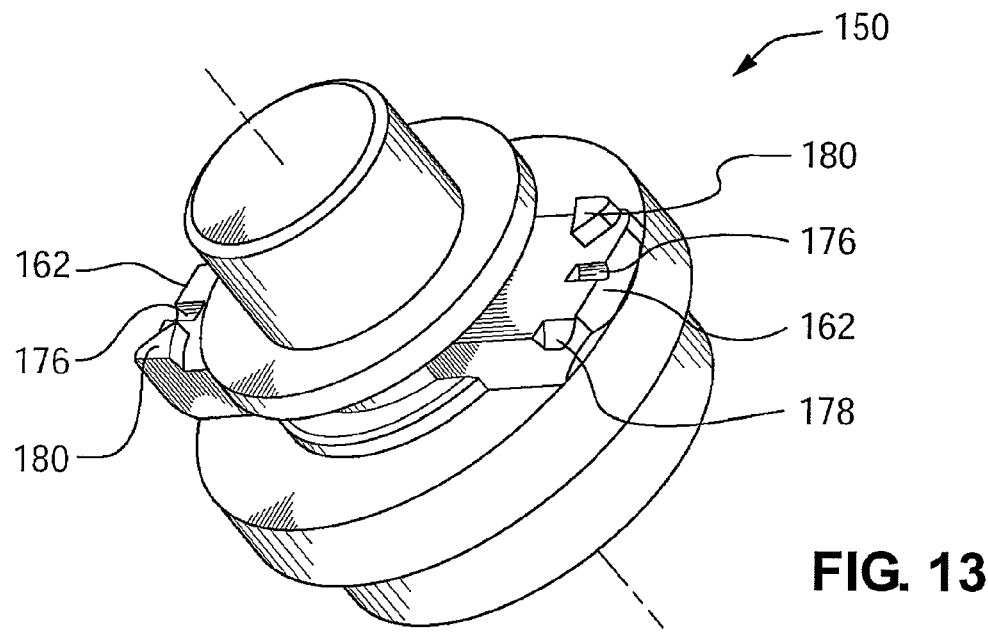
FIG. 13 is a perspective view from another viewpoint of the camera shown in FIG. 12.
Figure 15:
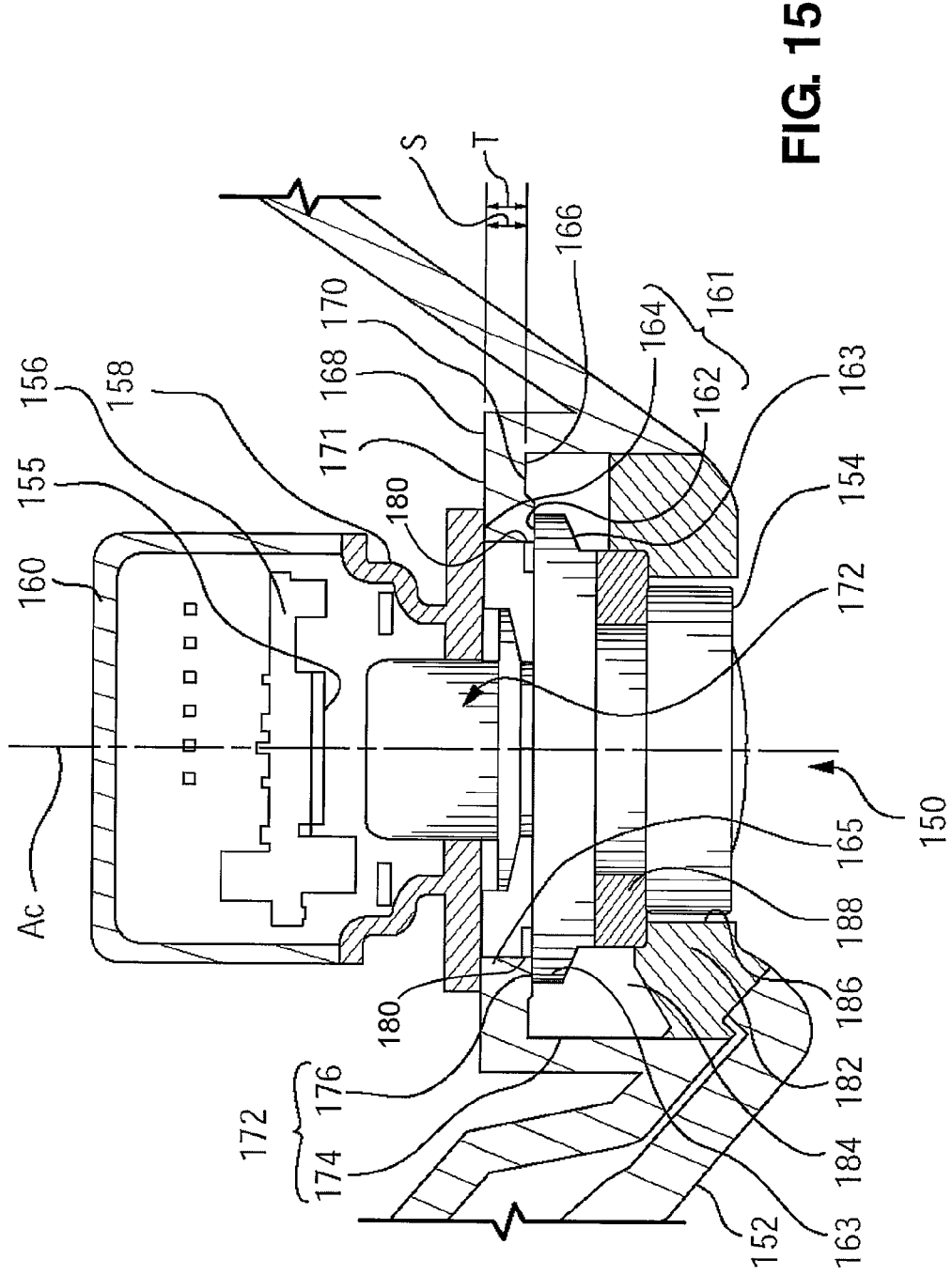
FIG. 15 is a sectional side view of the vehicle panel shown in FIG. 14 and the camera shown in FIG. 12.

The camera 150 includes a camera-associated locking structure 161, including two first locking surfaces 162 (FIGS. 13 and 15) and a second locking surface 164 (FIGS. 12 and 15). Each first locking surface 162 is situated on a locking element 163 and faces in a first axial direction, e.g., rearwardly. The second locking surface 164 faces in a second axial direction that is opposed to the first axial direction, e.g., forwardly, and is rearward of the first locking surface 162. Thus, the first and second locking surfaces 162 and 164 face each other. Referring to FIG. 15, the first locking structure 161 cooperates with a vehicle panel-associated locking structure 165 on the vehicle panel 152 to lock the camera 150 to the vehicle panel 152. The vehicle panel-associated locking structure 165 includes third and fourth locking surfaces 166 and 168, which may be on the outside and inside surfaces of the vehicle panel 152, shown at 170 and 171. The third and fourth locking surfaces 166 and 168 thus face away from each other.

Figure 14:
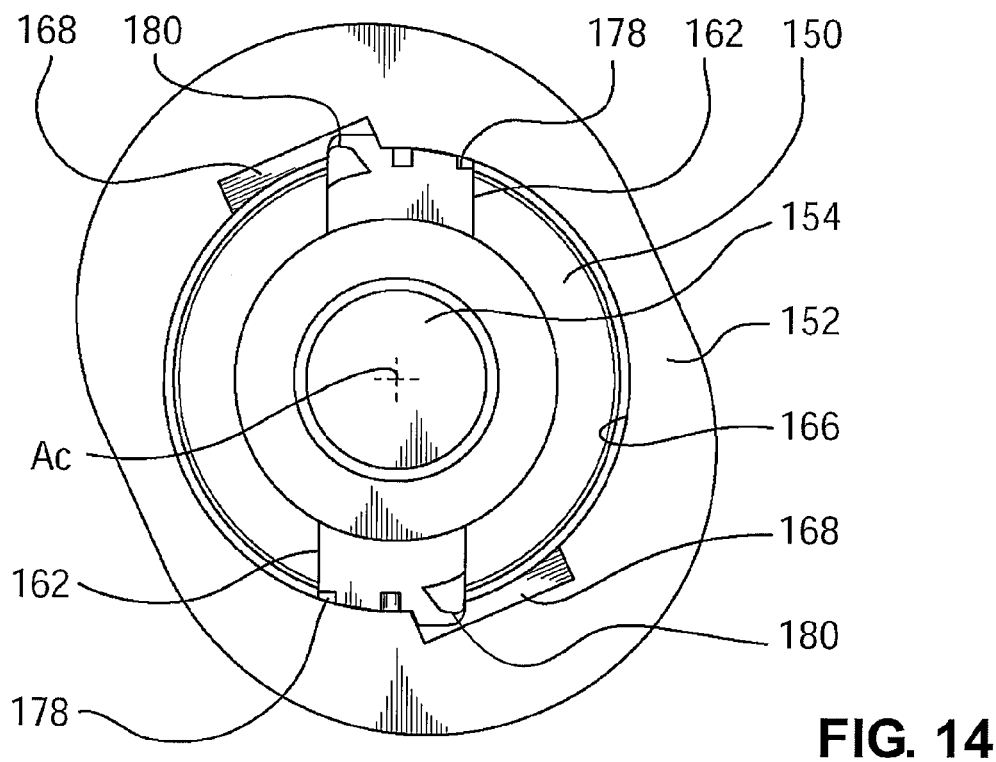
FIG. 14 is an elevation view of a vehicle panel showing a lens member from the camera shown in FIG. 12 engaged therewith.

As shown in FIG. 14, the vehicle panel 152 includes a camera mounting aperture 172, and a first locking element pass-through 173 for the locking elements 163 on which the first locking surfaces 162 are situated.

Referring to FIG. 15, the first and second locking surfaces 162 and 164 may be spaced apart by a spacing S that may be related to the local thickness of the vehicle panel 152, shown at T in FIG. 15. The spacing S may be the same as the spacing T. The spacing S may alternatively be different than the spacing T. For example, the spacing S may be less than the spacing T, thereby providing an interference fit between the camera-associated locking structure 161 and the vehicle-based locking structure 163.

The description of the mounting of the camera 150 will be made with reference to FIG. 15. To mount the camera 150 to the vehicle panel 152, the camera 150 is inserted through the camera mounting aperture 172 with the first locking elements 163 oriented to pass through the first locking element pass-throughs 173 (FIG. 14). The first locking surfaces 162 are then rotated about the axis Ac (shown as a point in FIG. 14) to a locking position (shown in FIGS. 14 and 15). Referring to FIG. 15, in the locking position the first and second locking surfaces 162 and 164 capture the vehicle panel 152 therebetween. A detent mechanism 173 may be provided to hold the camera 150 rotationally in its operating position. The detent mechanism 173 may include a first detent element 174, which may be, for example, a boss, on the third locking surface 170 and a second detent element 176, which may be, for example, a notch (shown more clearly in FIG. 13), on one or more of the first locking surfaces 162. In an embodiment that is not shown, it will be understood that the boss 174 (FIG. 15) could alternatively be positioned on one or more of the first locking surfaces 162 and the notch 176 may be positioned on the vehicle panel 152.

Referring to FIG. 14, to facilitate rotation of the camera 150 when the locking elements 163 are passed through the first locking element pass-throughs 173, a lead-in 178 (shown also in FIG. 13) may be provided on each front locking element 163. A shoulder 180 (FIGS. 13 and 14) may also be provided on the first locking elements 163 to engage the edge of the camera mounting aperture 172 (FIG. 14) to center the camera 150 therein.

While one second locking surface 164 is shown (e.g., a continuous flange that extends circumferentially all the way around the camera 150) it is optionally possible to have a plurality of second locking surfaces 164 that are situated on small flange portions that are circumferentially spaced from one another (similar to the circumferentially spaced first locking elements 163).

Figure 16:
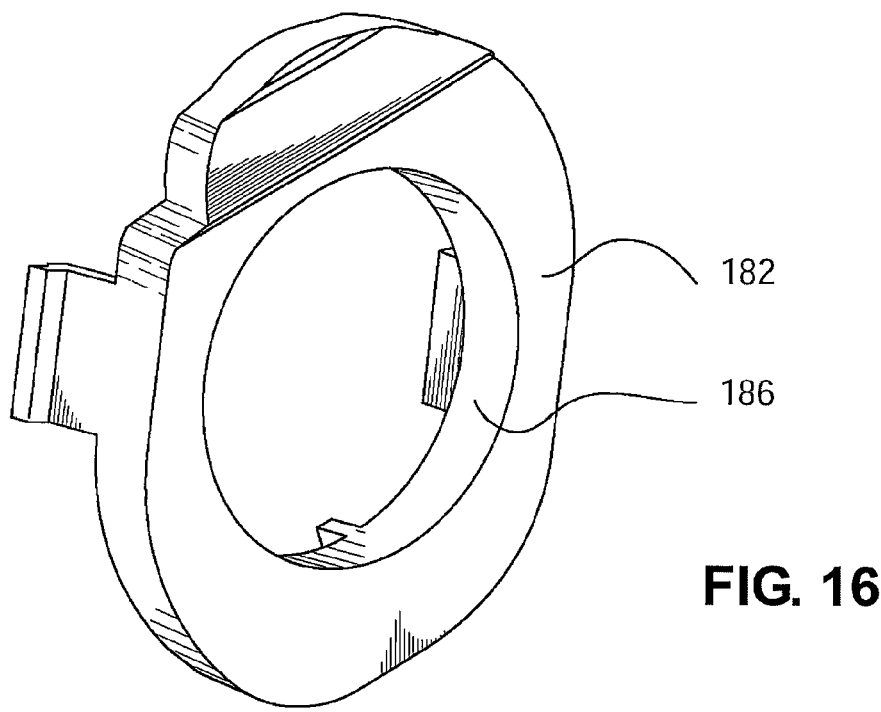
FIG. 16 shows a trim piece that can be mounted to the vehicle panel with the camera shown in FIG. 12.

Referring to FIG. 15, an optional trim piece 182 (also shown individually in FIG. 16) may be provided that clips into a depression 184 (FIG. 15) in the vehicle panel 152 in which the camera mounting aperture 172 and first locking element pass-throughs 173 (FIG. 14) are provided. The trim piece 182 rests flush with the vehicle panel 152 and itself has a camera aperture 186 for the pass-through of the lens member 154. The lens member 154 may rest substantially flush with the camera aperture 186. The camera 150 may further include a seal member 188 that is positioned between the lens member 154 and the trim piece 182 to inhibit the pass through of contaminants from outside the vehicle panel 152 into the depression 184 to potentially damage the camera 150.

As shown in FIG. 15, the first locking surfaces 162 are shown as being provided on the lens member 154, and the second locking surface 164 is shown as being provided on the front housing member 158. It is alternatively possible for the first locking surfaces 162 to be provided on the front housing member 158, along with the second locking surface 164.

Figure 17:
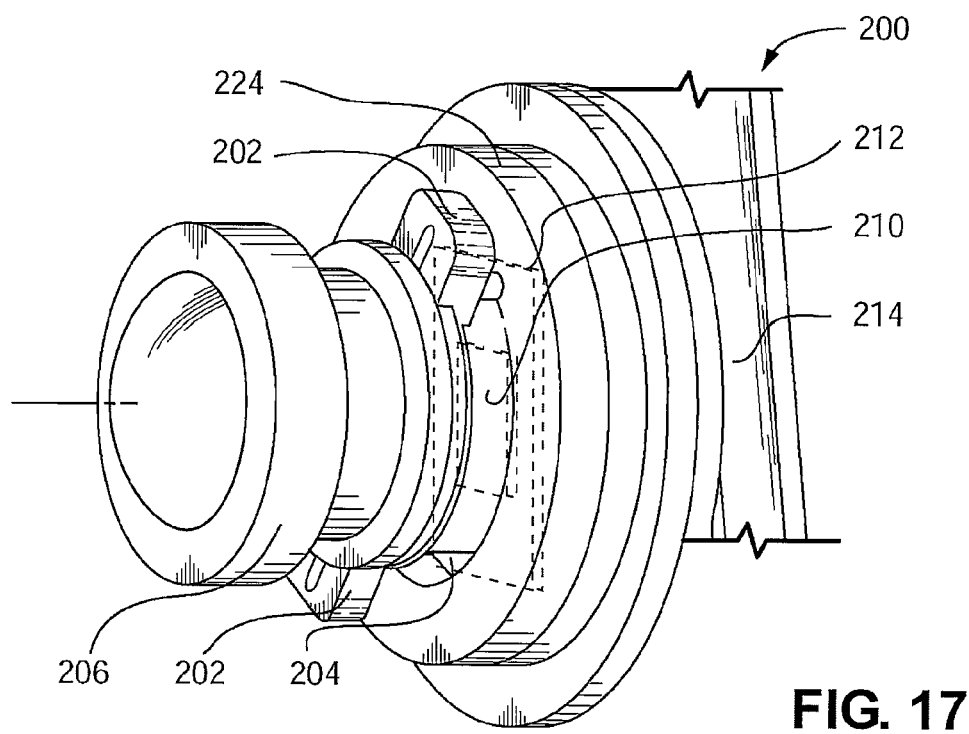
FIG. 17 is a perspective view of a camera in accordance with another embodiment of the present invention.
Figure 18:
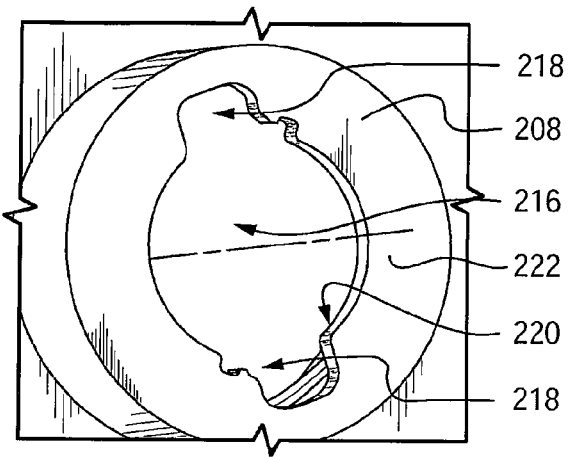
FIG. 18 is a perspective view of a vehicle panel for receiving the camera shown in FIG. 17.

Reference is made to FIG. 17, which shows a camera 200 in accordance with another embodiment of the present invention. The camera 200 may be similar to the camera 150 (FIG. 12). One difference in particular is that the first locking elements, shown at 202, are incorporated into the front housing member, shown at 204, instead of being incorporated into the lens member. By eliminating any locking surfaces from the lens member, shown at 206, the lens member 206 is subject to reduced stress during installation of the camera 200 on the vehicle panel, shown at 208 (FIG. 18). Reducing the stresses on the lens member 206 (FIG. 17) reduces the likelihood that the lens member 206 will come out of its optimal position for focusing images on the imaging element, shown at 210. The camera 200 further includes a circuit board 212 and a rear housing member 214 which may be similar to the circuit board 156 and the rear housing member 160 respectively (FIG. 15). The vehicle panel 208 (FIG. 18) may include a camera mounting aperture 216, a pair of first locking element pass-throughs 218, a third locking surface 220 (FIG. 19) and a fourth locking surface 222, which may be similar to the camera mounting aperture 172 (FIG. 14), the pair of first locking element pass-throughs 173 (FIG. 14), the third locking surface 170 (FIG. 15) and the fourth locking surface 171 (FIG. 15) respectively.

Figure 19:
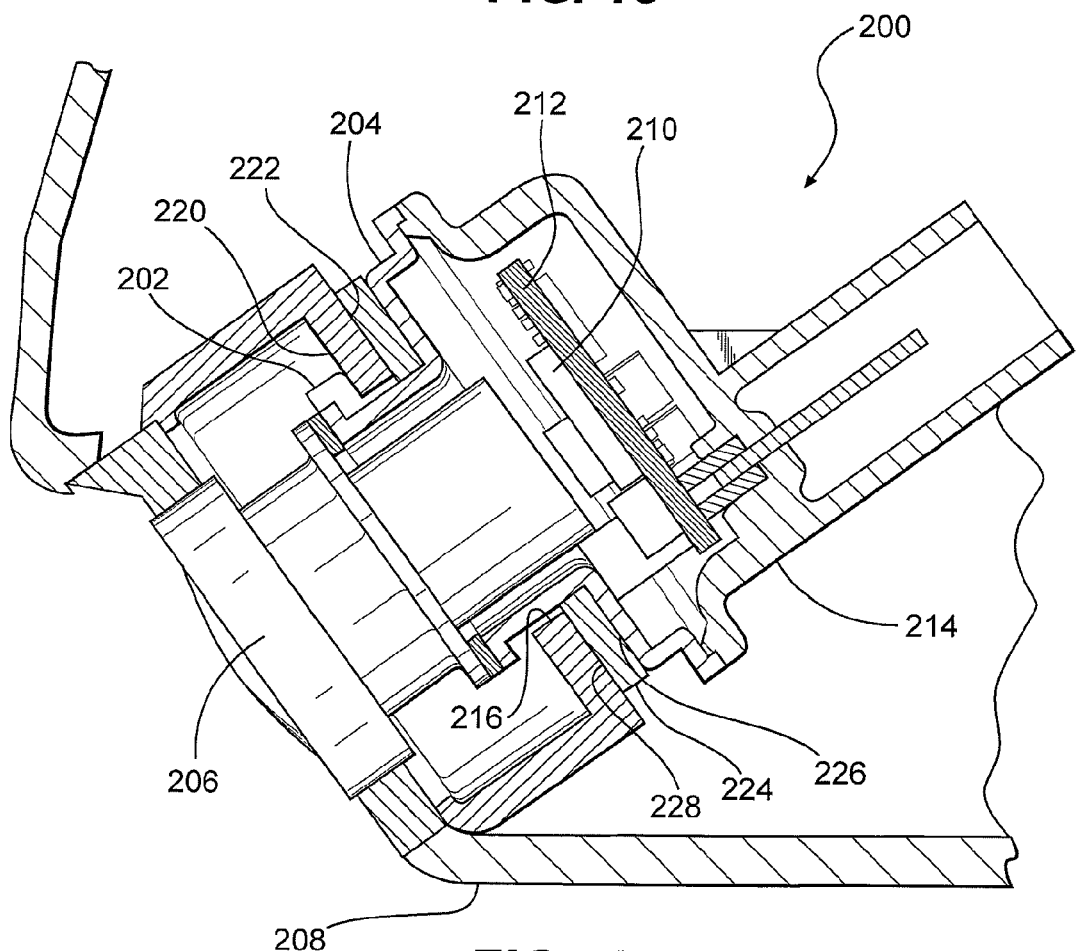
FIG. 19 is a sectional side view of the camera shown in FIG. 17 assembled with the vehicle panel shown in FIG. 18.

With reference to FIG. 19, another difference with the camera 200 is that it may include a gasket 224 that rests on a shoulder 226 on the front housing member 204, and that has an axially facing surface 228 that acts as the second locking surface. The gasket 224 is compressed by a selected amount when the camera 200 is mounted on the vehicle panel 208.

As shown in FIG. 17, the camera 200 may further include a first detent element 230 in associated with each first locking element 202, the front housing member 204 and a second detent element 232 for each first detent element 230, positioned on the edge of the camera mounting aperture 216 (FIG. 18). The first detent elements 230 (FIG. 17) engage the second detent elements 232 (FIG. 18) to hold the camera 200 at a selected rotational position, and also to center the camera 200 in the camera mounting aperture 216. The first and second detent elements 230 and 232 make up a detent mechanism 234. It will be noted that only one first detent element 230 is shown in FIG. 17 due to the viewpoint portrayed in that figure.

Figure 20:
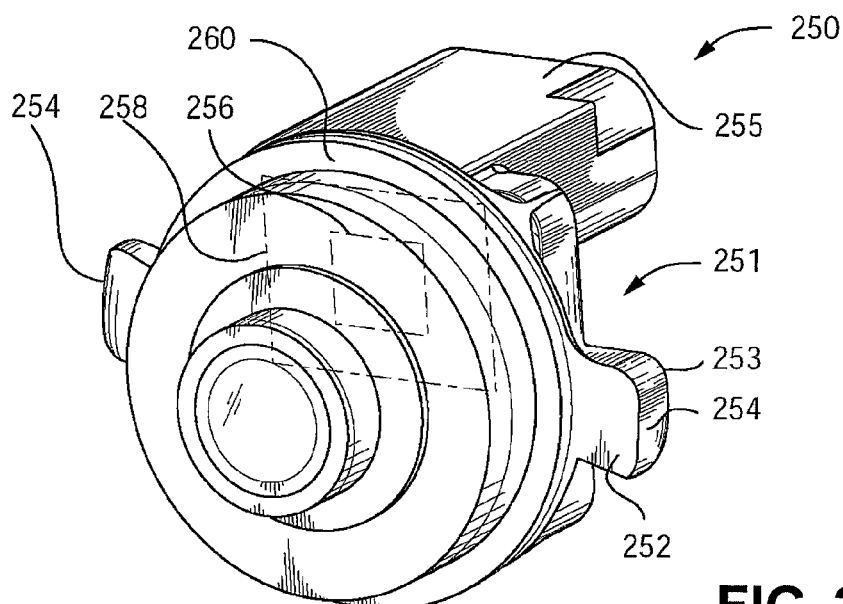
FIG. 20 is a perspective view of a camera in accordance with another embodiment of the present invention.

Reference is made to FIG. 20, which shows a camera 250 in accordance with another embodiment of the present invention. The camera 250 may be similar to the camera 150 (FIG. 12). One difference in particular is that the camera-associated locking structure, shown at 251 includes the third and fourth locking surfaces shown at 252 and 253 respectively. The third and fourth locking surfaces are provided on locking elements 254 that are incorporated into the rear housing member, shown at 255, instead of being incorporated into the lens member. The camera 250 further includes an imaging element 256, a circuit board 258 and a front housing member 260.

Figure 21:
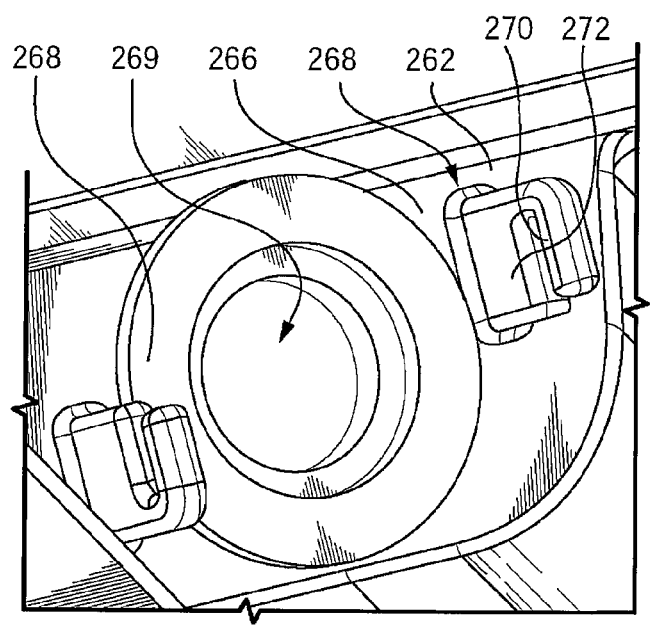
FIG. 21 is a perspective view of a vehicle panel for receiving the camera shown in FIG. 20.
Figure 22:
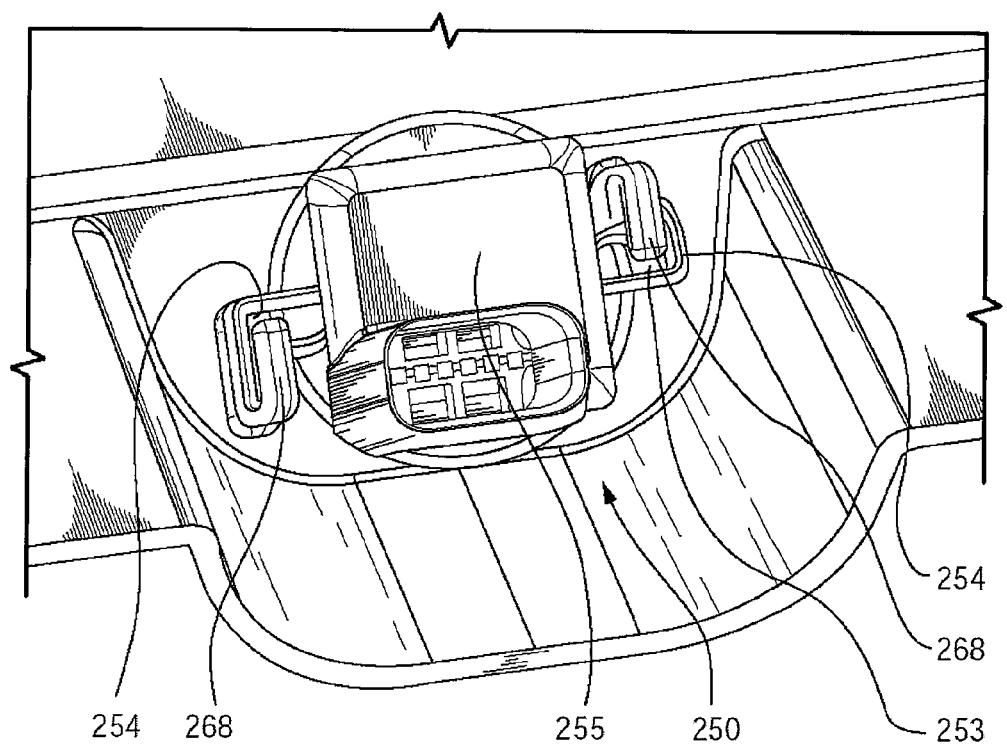
FIG. 22 is a perspective view of the camera shown in FIG. 20 assembled with the vehicle panel shown in FIG. 21.

The vehicle panel that receives the camera 250 is shown at 262 (FIG. 21). The vehicle panel 262 includes an outside surface (not shown) and an inside surface 266. The vehicle panel-associated locking structure is shown at 268 and is mounted to the inside surface 266 about a camera mounting aperture 269. The vehicle panel-associated locking structure 268 includes the first and second locking surfaces, shown at 270 and 272.

To mount the camera 250 to the vehicle panel 262, the camera 250 is inserted through the camera mounting aperture 269, and the camera-associated locking elements 254 are rotated until they are captured by the vehicle panel-associated locking elements 268.

Figure 23:
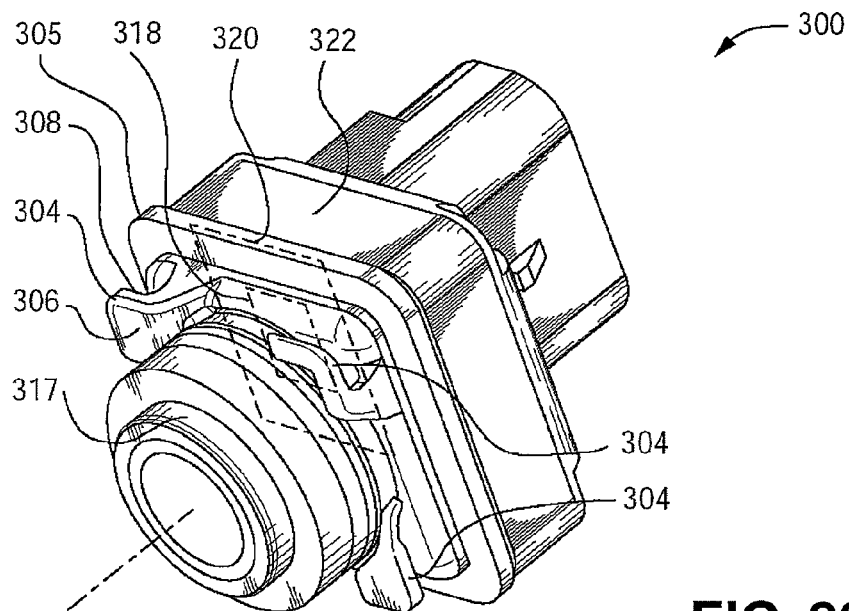
FIG. 23 is a perspective view of a camera in accordance with another embodiment of the present invention.
Figure 24:
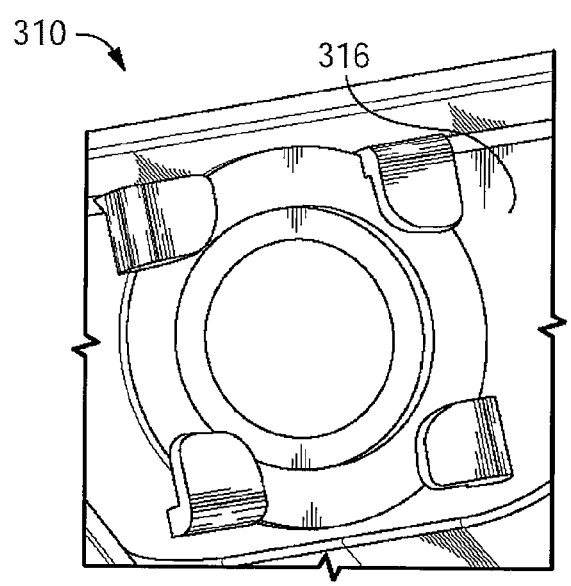
FIG. 24 is a perspective view of a vehicle panel for receiving the camera shown in FIG. 23.
Figure 24A:
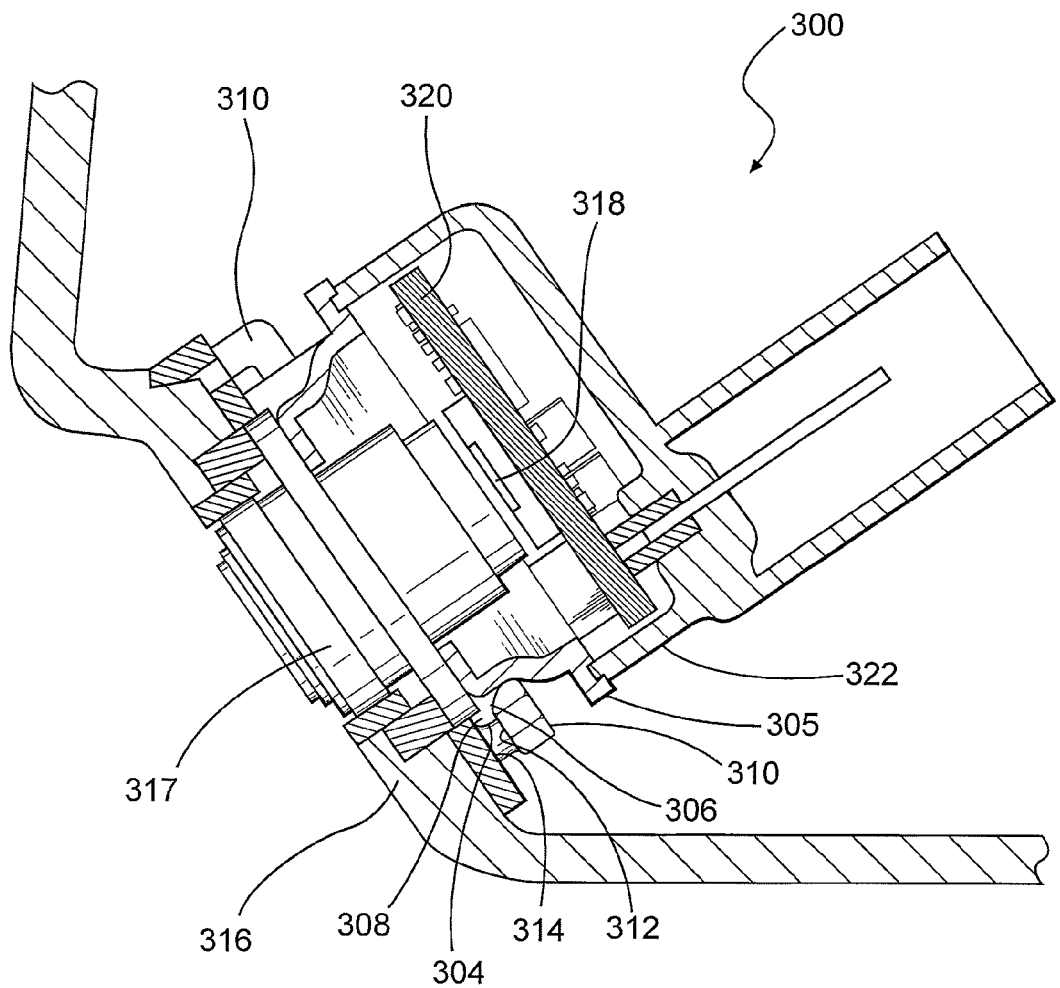
FIG. 24a is a sectional side view of the camera shown in FIG. 23 assembled with the vehicle panel shown in FIG. 24.

Reference is made to FIG. 23, which shows a camera 300 in accordance with another embodiment of the present invention. The camera 300 may be similar to the camera 250 (FIG. 20). One difference in particular is that the camera-associated locking structure, shown at 302 includes four locking elements 304 on the front housing member, shown at 305. Each locking element 304 has thereon third and fourth locking surfaces shown at 306 and 308 respectively. The third and fourth locking surfaces 306 and 308 are captured by a vehicle panel-associated locking element 310 (FIG. 24) that includes first and second locking surfaces 312 and 314 (FIG. 24*a*) on the vehicle panel, shown at 316. The camera 300 further includes a lens member 317, an imaging element 318, a circuit board 320 and a rear housing member 322.

Providing a camera, such as the cameras 150, 200, 250 and 300 (FIGS. 12, 17, 20 and 23), that mounts directly onto the vehicle panel without separate mounting fasteners (e.g., screws) reduces cost of the camera. Additionally, the mounting of the camera can be carried out relatively quickly, further reducing the cost associated with the camera. Additionally, it will be noted that, in some embodiments, namely those shown in FIGS. 12, 20 and 23, the camera-associated locking structure is shown as being mounted on the front housing member and/or on the lens member 154. The tolerances that are involved in the orientation and position of the lens member 154 include the tolerances associated with the vehicle panel 152, the lens member 154 and the front housing member 158. By comparison, some prior art cameras mount to a vehicle panel through their rear housing member.

In the embodiments shown in FIGS. 12, 17, 20 and 23, the first and second locking surfaces have been shown to face directly axially towards each other and the third and fourth locking surface have been shown to face directly axially away from each other. It will be understood that the first and second locking surfaces may generally face each other (e.g., they may both be angled to some extent away from each other) while still performing their function as locking surfaces. Similarly the third and fourth locking surfaces may generally face away from each other (e.g., they may both be angled to some extent from being oriented directly away from each other) while still performing their function as locking surfaces.

Figure 25:
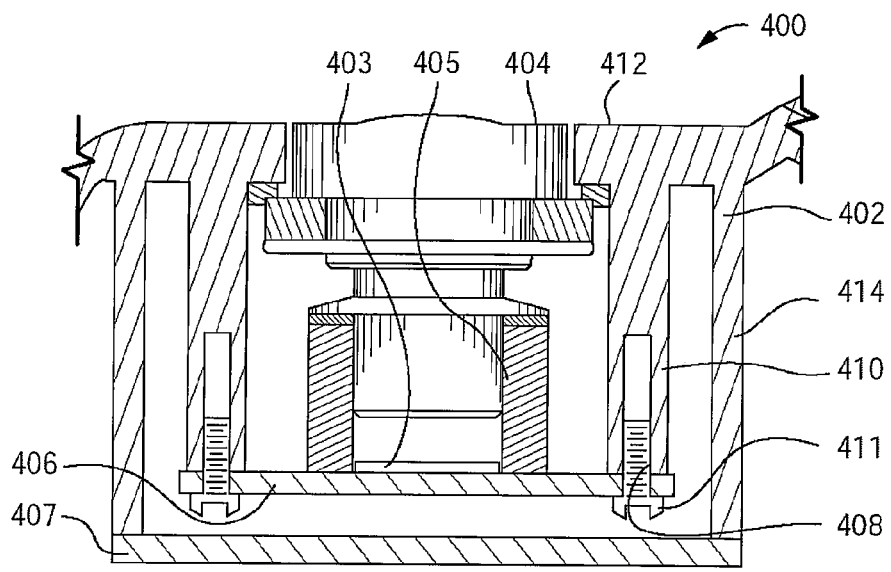
FIG. 25 is a sectional side view of a combination of a camera and a vehicle panel camera in accordance with another embodiment of the present invention.
Figure 26:
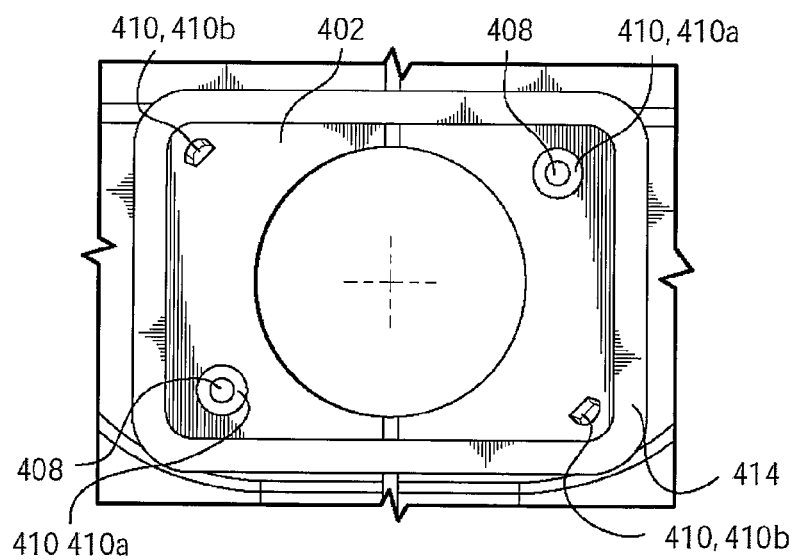
FIG. 26 is an elevation view of the vehicle panel shown in FIG. 25.

Reference is made to FIG. 25, which shows a camera 400 in accordance with another embodiment of the present invention. The camera 400 mounts to a vehicle panel 402 without the need for a front housing member. An advantage of eliminating the front housing member is that the camera 400 may occupy a reduced amount of space relative to some cameras of the prior art. The camera 400 may face rearwardly on the vehicle. Additionally, the steps in assembling the camera 400 and assembling the camera 400 to the vehicle panel 402 may be reduced relative to a camera that includes a separate front housing member.

The camera 400 includes a lens member 404, an imaging element 403 which may be similar to the imaging element 15 (FIG. 1), a circuit board 406 and a rear housing member 407. The lens member 404 may be configured to be pre-assembled to the circuit board 406 by a connecting structure 405 at a suitable distance for focusing on the imaging element 403 that may be contained on the circuit board 406. The connecting structure 205 may be any suitable structure, such as, for example, a cylinder that is glued to both the circuit board 406 and the lens member 404.

The circuit board 406 with the lens member 404 mounted thereto is mounted to internally threaded apertures 408 that are provided on supports 410 that may be molded directly in the vehicle panel 402 for receiving threaded circuit board mounting fasteners 411. The supports 410 may be sized so that when the circuit board 406 is mounted thereon the lens member 404 lies approximately flush with the outside surface shown at 412 of the vehicle panel 402. To facilitate assembly of the camera 400 into the vehicle panel 402, some of the supports 410 may not include internally threaded apertures, and thus serve only as spacers. In the embodiment of the vehicle panel 402 shown in FIG. 25, two of the supports, shown at 410a, include the apertures 208, and two of the supports, shown at 410b, do not include apertures.

Referring again to FIG. 25, after mounting the circuit board 406 to the vehicle panel 402, a rear housing member 407 may be connected to a wall structure 414 that is molded directly into the vehicle panel 402. The connection of the rear housing member 407 may be by any suitable means, such as by adhesive. The rear housing member 407 thus protects the circuit board 406 and other camera components from contaminants that could damage those components.

The vehicle panel 202 may be any suitable vehicle panel, such as a liftgate handle or panel, a tailgate handle or panel, a spoiler or a lightbar.

A seal member 216 may be provided between the lens member 204 and the vehicle panel 202 to inhibit the pass through of contaminants from outside the vehicle panel 152 to potentially damage the camera 150.

Figure 10:
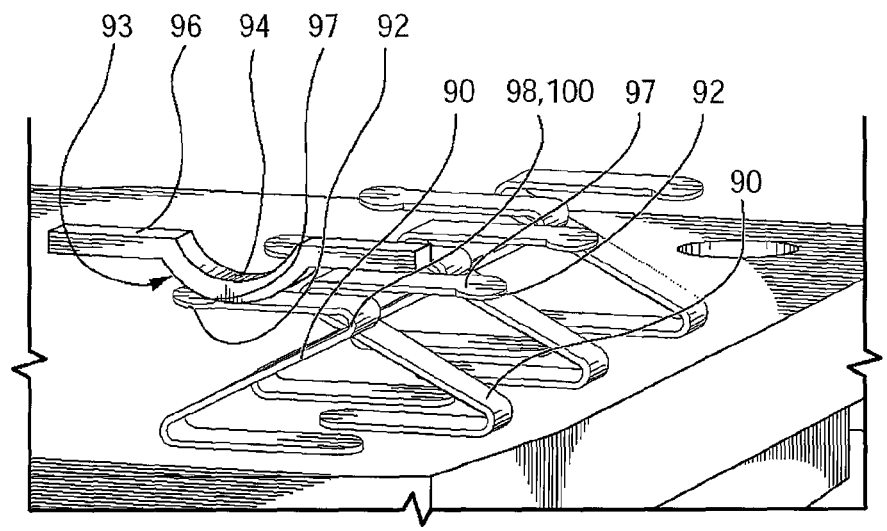
FIG. 10 is a magnified perspective view of a portion of the camera shown in FIG. 9.
Figure 27:
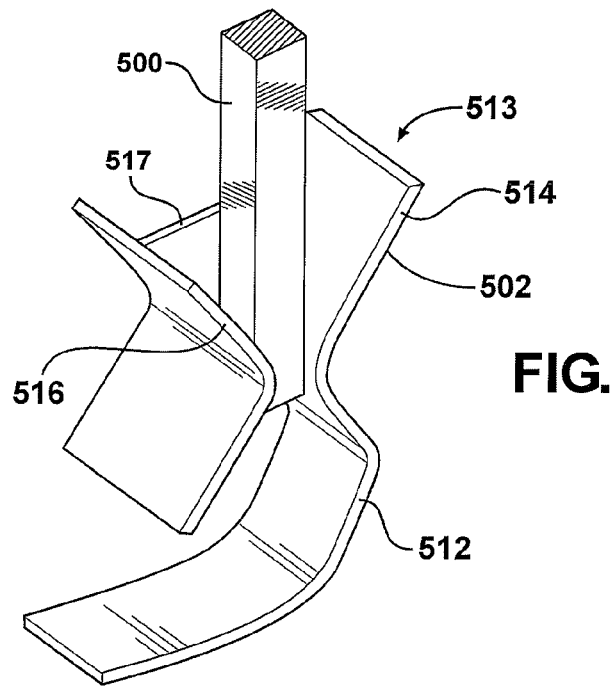
FIG. 27 is a perspective view of an alternative set of front and rear connectors for use with the camera shown in FIGS. 9-11.
Figure 28:
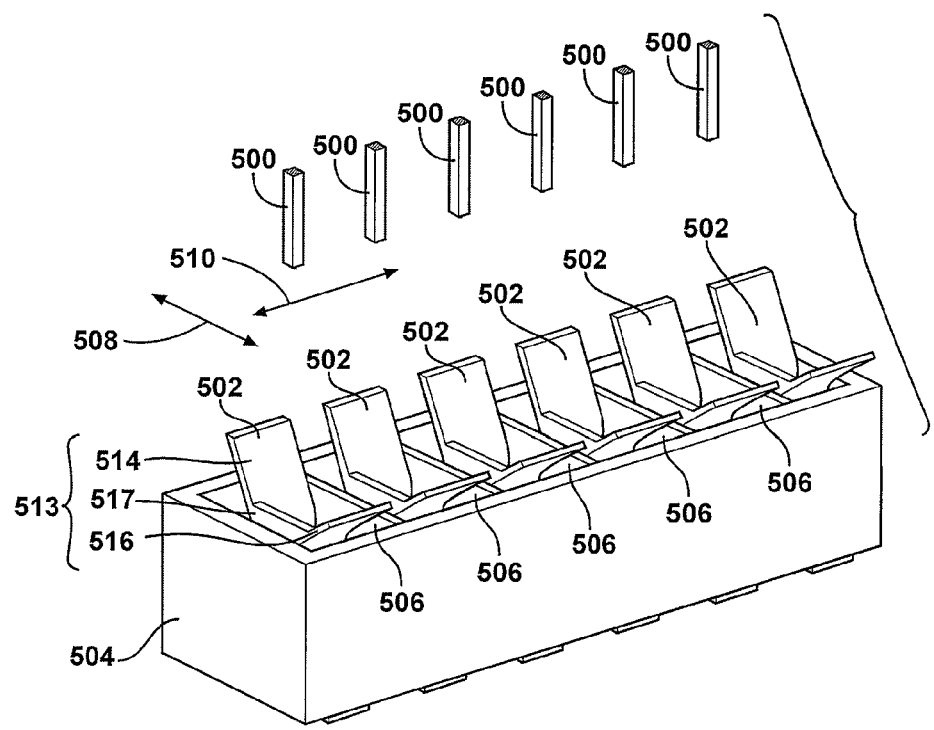
FIG. 28 is a perspective view of a plurality of the rear connector shown in FIG. 27 and a plurality of the front connector shown in FIG. 27, in a connector housing for mounting to a circuit board in the camera shown in FIGS. 9-11.

Reference is made to FIG. 27, which shows a set of male, front and female, rear electrical connectors 500 and 502 respectively that can be used in place of the electrical connectors 90 and 96 respectively in the embodiment shown in FIGS. 9-11. The male electrical connector 500 may be a simple pin that is molded into and extends downwardly from the rear housing member 84, and may be similar in shape to the rear electrical connector 25 in the embodiment shown in FIGS. 1-7. The female electrical connector 502 is provided in the female electrical connector housing 504 (FIG. 28) that is fixedly mounted to the circuit board 88 (FIG. 9). Preferably, the housing 504 (FIG. 28) is divided into individual chambers 506 for each electrical connector 502 to ensure that the connectors 502 do not bend in an unexpected way that drives two adjacent connectors 502 to contact one another, during insertion of the pins 500 therein. Each individual female electrical connector 502 is permitted to flex individually in a first direction shown by arrow 508 to accommodate an imperfectly positioned male connector 500. Furthermore, each individual electrical connector 502 has a width in a second direction shown by arrow 510, which is perpendicular to the first direction. The width of the female connectors 502 is selected to be sufficiently wide to accommodate a selected amount of tolerance in the positions of the individual male connectors 500. Thus, the female connectors 502 which are associated with the circuit board 88 (and thus with the front housing member 82, shown in FIG. 9) can accommodate a selected amount of tolerance in the two directions 508 and 510 that relate to the alignment between the male connectors 500 which are associated with the rear housing member 84.

To permit the bending in the first direction 508, the female connector 502 includes a resilient flexure member 512 (FIG. 27), which permits the pin capture head, shown at 513 to move as needed to accommodate tolerance in the pin 500 in the first direction. The pin capture head 513 may be made up of a pair of chevron shaped arms 514 and 516 that are integrally connected to each other through a body plate 517. The arms 514 and 516 are resiliently flexible relative to the body plate 517. The arms 514 and 516 are preferably positioned less than the thickness of the pins 500 apart, so that at least one of the arms 514 and 516 is ensured to remain in contact with a pin 500 inserted into the female connector 502. The chevron shaped arms 514 and 516 also provide lead-in for the pins 500 to promote the sliding of the pins 500 into female connector 502.

The above described connecting structure between the first and second connectors 500 and 502 permits the housing members 84 and 86 to mount together in an aligned way, similar to how they mount together in FIG. 11, while reducing the potential for failure of the connectors 90 and 96 that would result from any misalignment between them.

The camera in accordance with an embodiment of the present invention need not be mounted at the rear of a vehicle or as a rearview camera. The camera may be mounted anywhere suitable about the vehicle, and may be mounted on the side of the vehicle or the front of the vehicle, for example. In such alternative installations, the camera could face the front or side of the vehicle, or may, for example, face the rear of the vehicle while being mounted on the side of the vehicle (e.g., for blind-spot monitoring for the vehicle).

While the above description constitutes a plurality of embodiments of the present invention, it will be appreciated that the present invention is susceptible to further modification and change without departing from the fair meaning of the accompanying claims.

The invention claimed is:

1. A camera for mounting on a vehicle, comprising:
    a front housing member;
    a lens member mounted to the front housing member;
    an imaging element that is positioned to receive images from the lens member;
    a circuit board mounted to the front housing member, wherein the circuit board is configured to send to another component signals relating to images received by the imaging element, wherein the circuit board has at least one front electrical connector thereon; and
    a rear housing member configured to mate with the front housing member, wherein the rear housing member has at least one rear electrical connector extending therefrom, and wherein, as the rear housing member is mated with the front housing member, the at least one rear electrical connector aligns with and electrically connects to the at least one front electrical connector, and wherein the rear housing member has a rear alignment structure that aligns the at least one rear electrical connector with respect to the at least one front electrical connector as the rear housing member is mated with the front housing member, and wherein the rear housing member mates with the front housing member to define a camera interior, wherein the imaging element, the circuit board, the at least one front electrical connector and the at least one rear electrical connector are positioned in the camera interior.

2. A camera as claimed in claim 1, wherein the at least one rear electrical connector is at least one conductive pin and wherein the at least one front electrical connector is a female electrical connector.

3. A camera as claimed in claim 2, wherein the at least one conductive pin is the rear alignment structure.

4. A camera as claimed in claim 2, wherein the at least one female electrical connector is positioned in a female electrical connector housing, and wherein the rear alignment structure includes a sleeve that snugly receives the female electrical connector housing.

5. A camera as claimed in claim 4, wherein the sleeve is integral with the rear housing member.

6. A camera as claimed in claim 1, wherein the at least one rear electrical connector is integral with the rear housing member.

7. A camera as claimed in claim 6, wherein the at least one rear electrical connector is insert molded into the rear housing member.

8. A camera as claimed in claim 1, wherein the front and rear housing members are sealingly joined together.

9. A camera as claimed in claim 1, wherein the front housing member has a front housing member interior surface that has a front housing member coating of electrically conductive material thereon, and wherein one of the at least one front electrical connector is in electrical communication with the front housing member coating and is electrically connectable to ground.

10. A camera as claimed in claim 9, wherein the circuit board is mounted to the front housing with an electrically conductive circuit board fastener that is in electrical communication with the front housing member coating.

11. A camera as claimed in claim 10, wherein the rear housing member has a rear housing member interior surface that has a rear housing member coating thereon, and wherein one of the at least one rear electrical connector is in communication with the rear housing member coating and is electrically connectable to ground.

12. A camera as claimed in claim 11, wherein the said one of the at least one rear electrical connector is in communication with the said one of the at least one front electrical connector.

13. A camera for mounting on a vehicle, comprising:
a front housing member having a front housing member interior surface that has a front housing member coating of electrically conductive material thereon;
a lens member mounted to the front housing member;
an imaging element that is positioned to receive images from the lens member;
a circuit board mounted to the front housing member, wherein the circuit board is configured to send to another component signals relating to images received by the imaging element, wherein the circuit board is mounted to the front housing member, wherein the circuit board has at least one front electrical connector thereon, wherein one of the at least one front connector is in electrical communication with the front housing member coating and is electrically connectable to ground;
a rear housing member having at least one rear electrical connector thereon; and
wherein, as the rear housing member is mated with the front housing member, the at least one rear electrical connector aligns with and electrically connects to the at least one front electrical connector, and wherein the rear housing member has a rear alignment structure that aligns the at least one rear electrical connector with respect to the at least one front electrical connector as the rear housing member is mated with the front housing member.

14. A camera as claimed in claim 13, wherein the circuit board is mounted to the front housing member with an electrically conductive circuit board fastener that is in electrical communication with the front housing member coating.

15. A camera as claimed in claim 14, wherein the rear housing member has a rear housing member interior surface that has a rear housing member coating thereon, and wherein one of the at least one rear electrical connector is in communication with the rear housing member coating and is electrically connectable to ground.

16. A camera as claimed in claim 15, wherein the said one of the at least one rear electrical connector is in communication with the said one of the at least one front electrical connector.

17. A camera for mounting on a vehicle, comprising:
a front housing member;
a lens member mounted to the front housing member;
an imaging element that is positioned to receive images from the lens member;
a circuit board mounted to the front housing member, wherein the circuit board is configured to send to another component signals relating to images received by the imaging element, wherein the circuit board has at least one front electrical connector thereon; and
a rear housing member, wherein the rear housing member has at least one rear electrical connector extending therefrom, wherein, as the rear housing member is mated with the front housing member, the at least one rear electrical connector electrically connects to the at least one front electrical connector, and wherein, with the rear housing member mated with the front housing member, the at least one rear electrical connector and the at least one front electrical connector are urged together by at least one biasing member, and wherein the rear housing member mates with the front housing member to define a camera interior, wherein the imaging element, the circuit board, the at least one front electrical connector and the at least one rear electrical connector are positioned in the camera interior.

18. A camera as claimed in claim 17, wherein each front electrical connector has a rear end and each rear electrical connector has a front end, wherein the front and rear ends engage each other with a force that is substantially perpendicular to the front and rear ends.

19. A camera as claimed in claim 17, wherein each front electrical connector has a bend therein that is one of the at least one biasing member.

20. A camera as claimed in claim 17, wherein each front electrical connector has a rear end and each rear electrical connector has a front end, wherein the rear end and the front end are sized to permit a selected amount of misalignment therebetween while maintaining an electrical connection therebetween.

* * * * *